US012807416B2

(12) United States Patent
Mitten, Jr. et al.

(10) Patent No.: US 12,807,416 B2
(45) Date of Patent: Nov. 24, 2026

(54) AUTOMATED CAN RINSING SYSTEM FOR QUICKCHANGE CAN RINSER, AUTOMATIC GATLING GUN RINSER, AND SEMI-AUTOMATIC GATLING GUN CAN INVERTER

(71) Applicant: Entech Fabrications, Inc., Elk Grove Village, IL (US)

(72) Inventors: J. Patrick Mitten, Jr., Barrington, IL (US); Dale G. Chapman, Sr., New Lenox, IL (US); Frank Berndt, Mokena, IL (US); Tanner Schapman, Cincinnati, OH (US); Glen Kalchbrenner, Tinley Park, IL (US)

(73) Assignee: Entech Fabrications, Inc., Elk Grove Village, IL (US)

( * ) Notice: Subject to any disclaimer, the term of this patent is extended or adjusted under 35 U.S.C. 154(b) by 126 days.

(21) Appl. No.: 19/009,871

(22) Filed: Jan. 3, 2025

(65) Prior Publication Data

US 2025/0214780 A1 Jul. 3, 2025

Related U.S. Application Data

(60) Provisional application No. 63/617,138, filed on Jan. 3, 2024.

(51) Int. Cl.
*B65G 11/06* (2006.01)
*B65G 41/00* (2006.01)
(Continued)

(52) U.S. Cl.
CPC .......... *B65G 11/063* (2013.01); *B65G 41/002* (2013.01); *B65G 47/24* (2013.01);
(Continued)

(58) Field of Classification Search
CPC .... B65G 11/063; B65G 41/002; B65G 47/24; B65G 2201/0252; B65G 2203/0283; B65G 2203/044; B67C 7/00
(Continued)

(56) References Cited

U.S. PATENT DOCUMENTS 3,797,624 A * 3/1974 Powell ................ B65G 11/183 193/38
3,902,682 A * 9/1975 Woll ...................... B65G 51/24 406/182
7,617,921 B2 * 11/2009 Workman ........... B65G 11/103 193/29

FOREIGN PATENT DOCUMENTS

DE 102011010379 * 8/2012

* cited by examiner

*Primary Examiner* — Gene O Crawford
*Assistant Examiner* — Lester Iii Rushin
(74) *Attorney, Agent, or Firm* — Hanley, Flight & Zimmerman, LLC

(57) ABSTRACT

Disclosed is an automated system for changing over a can line. An example rotating turret with multiple can twists is used to align various can twists with a production line. The rotation of the turret is motorized and includes a system for precisely measuring the rotation of the turret and locking the turret in place at preselected orientations. Feed assemblies with moveable guide rails and transfer bars are configured to receive product from, or pass product to, the twists on the turret. The horizontal and vertical movements of the feed assembly guide rails, and the transfer bars, may be motorized. Various measures may be implemented to protect both the system from damage and operators of the system from injury.

20 Claims, 34 Drawing Sheets

(51) Int. Cl.
*B65G 47/24* (2006.01)
*B67C 7/00* (2006.01)

(52) U.S. Cl.
CPC ................ *B65G 2201/0252* (2013.01); *B65G 2203/0283* (2013.01); *B65G 2203/044* (2013.01); *B67C 7/00* (2013.01)

(58) Field of Classification Search
USPC ............................................................ 193/12
See application file for complete search history.

FIG. 9a
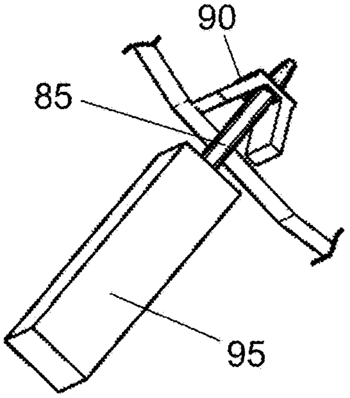
FIG. 9b
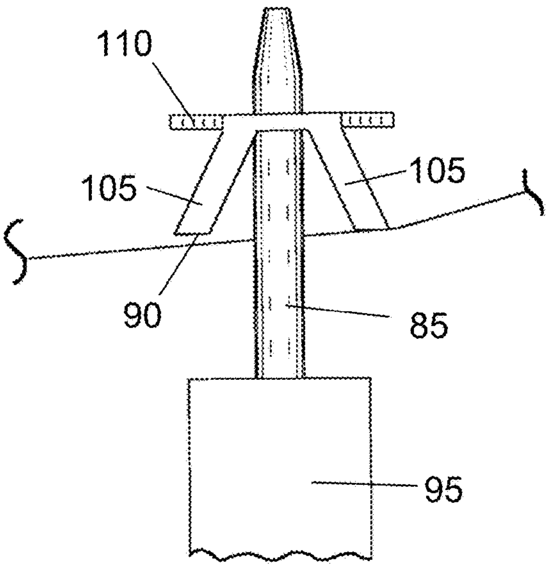
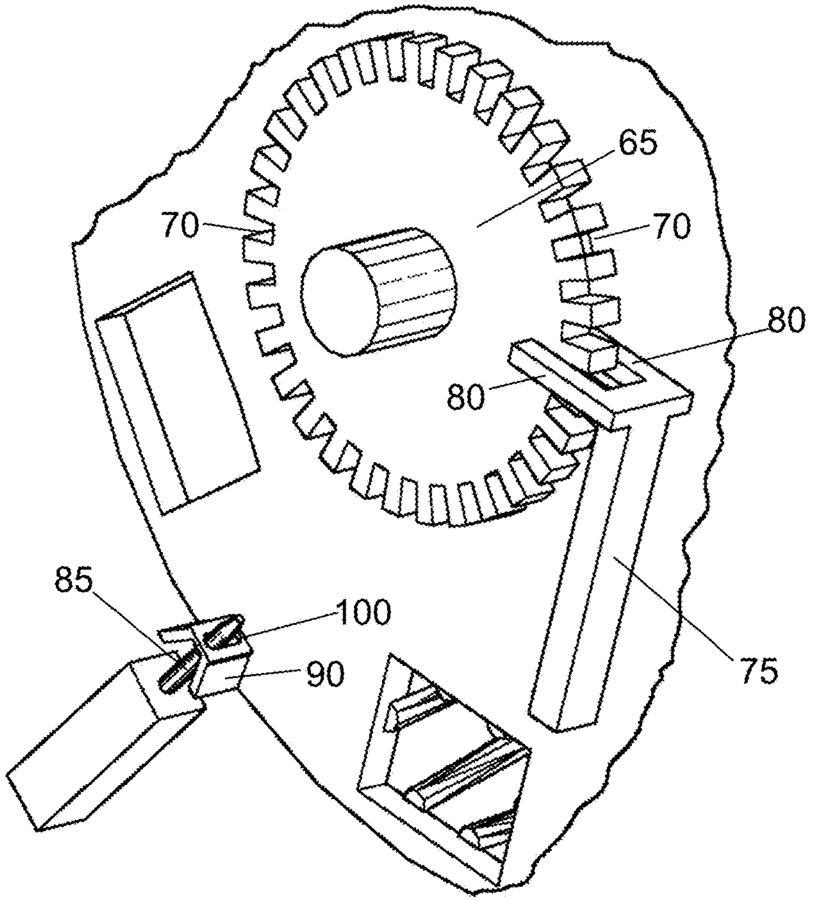
FIG. 10

550

| | A | B | C | D | E |
|---|---|---|---|---|---|
| 1 | Ingredient | value | min | max | EU |
| 2 | Wheel Position | 2 | 1 | 9 | count |
| 3 | Height | 402 | 1 | 1000 | mm |
| 4 | Width | 204 | 1 | 1000 | mm |
| 5 | Enable/Disable | 1 | 0 | 1 | bool |
| 6 | Wheel Encoder | 4551 | 0 | 40960 | encoder |
| 7 | Height Encloder | 967 | 0 | 10240 | encoder |
| 8 | Width Encoder | 284 | 0 | 10240 | encoder |
| 9 | Sleek | | | | |
| 10 | 7.5 oz Sleek (204 x 402) | | | | |

FIG. 36

AUTOMATED CAN RINSING SYSTEM FOR QUICKCHANGE CAN RINSER, AUTOMATIC GATLING GUN RINSER, AND SEMI-AUTOMATIC GATLING GUN CAN INVERTER

FIELD OF THE DISCLOSURE

The present disclosure relates in general to can manipulation systems, and more particularly to can manipulation systems that quickly change from handling one size of cans to another size of cans.

BACKGROUND OF THE DISCLOSURE

In the processing of containers such as cans and the like, it is usually necessary to rinse the cans. If a rinse is poured or otherwise invasively introduced into the cans, it becomes necessary to evacuate such fluid from such containers prior to ultimate use of the containers.

It is typical to employ several distinct processes to respectively invasively introduce rinsing fluid or air into containers such as cans and then evacuate such fluid or air as the cans pass along in a process production line.

BRIEF DESCRIPTION OF THE DRAWINGS

FIG. 9*a* is a partial perspective view of the system of FIG. 2 showing a turret locking pin and complimentary receiver on a turret disc.

FIG. 9*b* is an elevational view of the system of FIG. 2 showing a turret locking pin and complimentary receiver on a turret disc.

FIG. 10 is a partial perspective view of the system of FIG. 2 showing a turret locking pin and rotational counter.

FIG. 36 shows an example of a spreadsheet used to store information regarding a product that allows the system to quickly and efficiently reconfigure itself to accommodate a different size of can.

Figure 1:
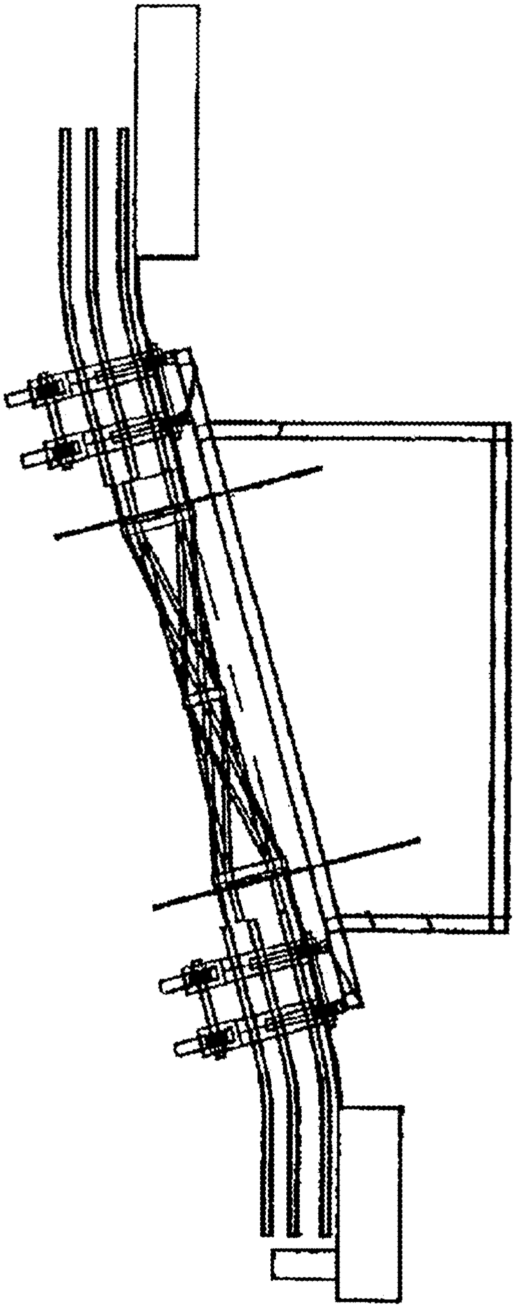
PRIOR ART FIG. 1
FIG. 1 is a side view of the integrated can inverter with adjustable components to accommodate various sizes from U.S. Pat. No. 7,617,921.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

The can rinsing systems for the rinsing of aluminum cans prior to the cans being filled with a beverage, or like product, tend to require a separate apparatus or system for every different size or shape of can. Some instances, however, in which adjustments can be made to accommodate the handling of a different size can, require complicated skilled labor and extensive separate special tools and expensive complicated equipment. This all requires an extensive inventory of tools and equipment in addition to experienced and skilled millwrights for preparation, operation and maintenance to have the system attempt to accommodate different sized cans.

Figure 5:
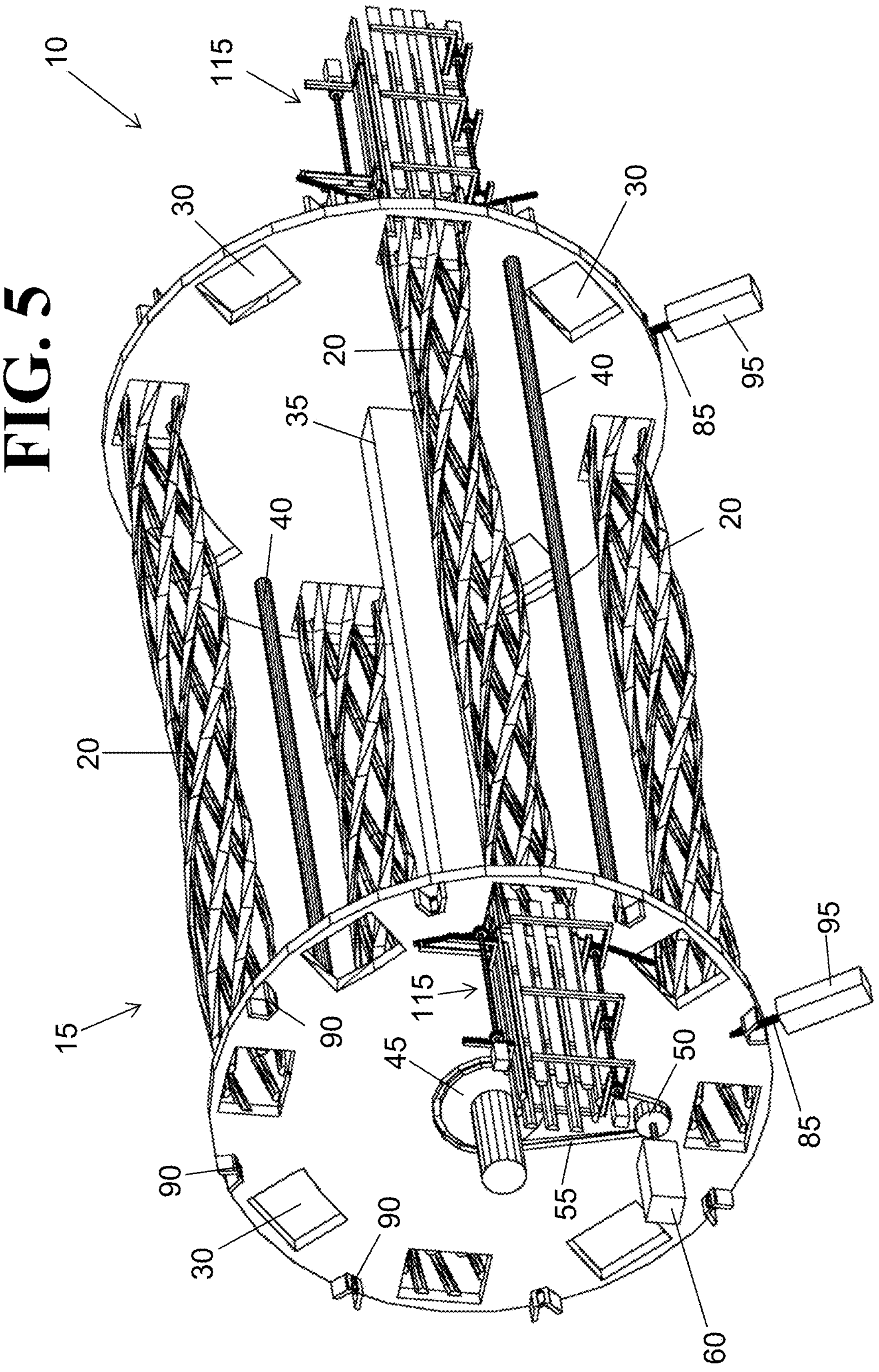
FIG. 5 is a front perspective view of the system of FIG. 2.
Figure 7:
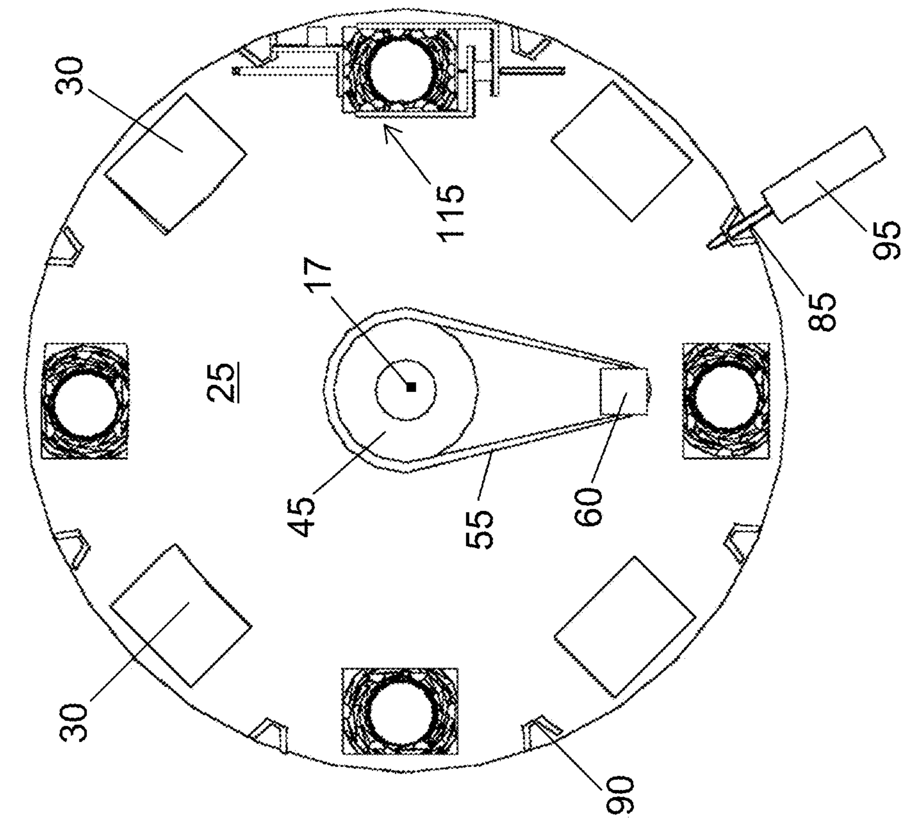
FIG. 7 is a front elevational view of the system of FIG. 2.
Figure 6:
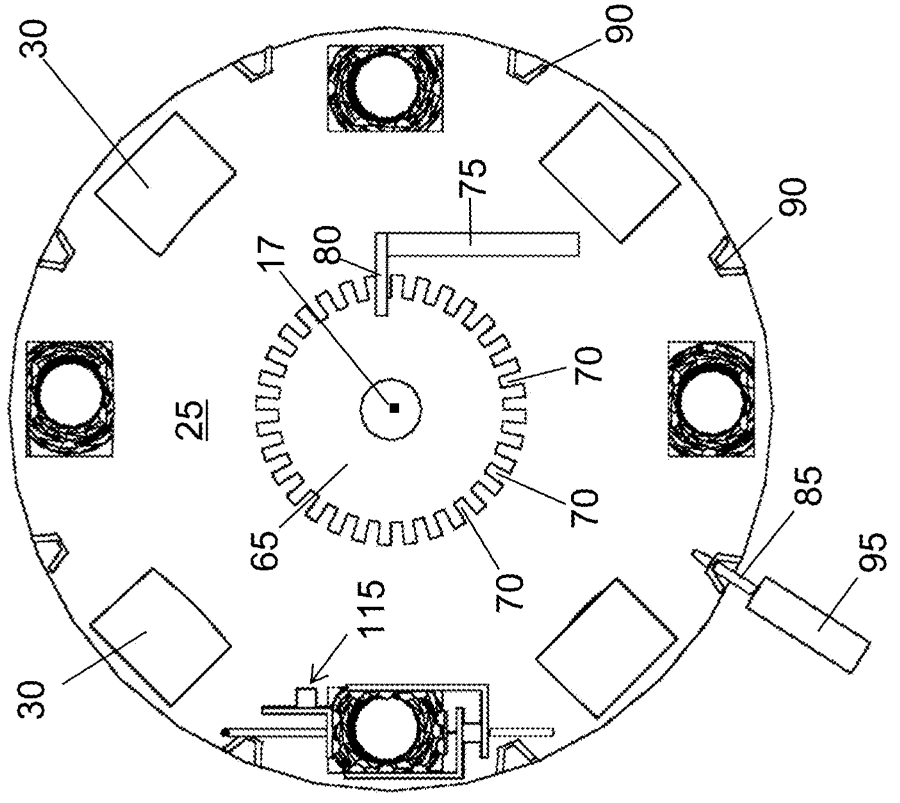
FIG. 6 is a back elevational view of the system of FIG. 2.
Figure 8:
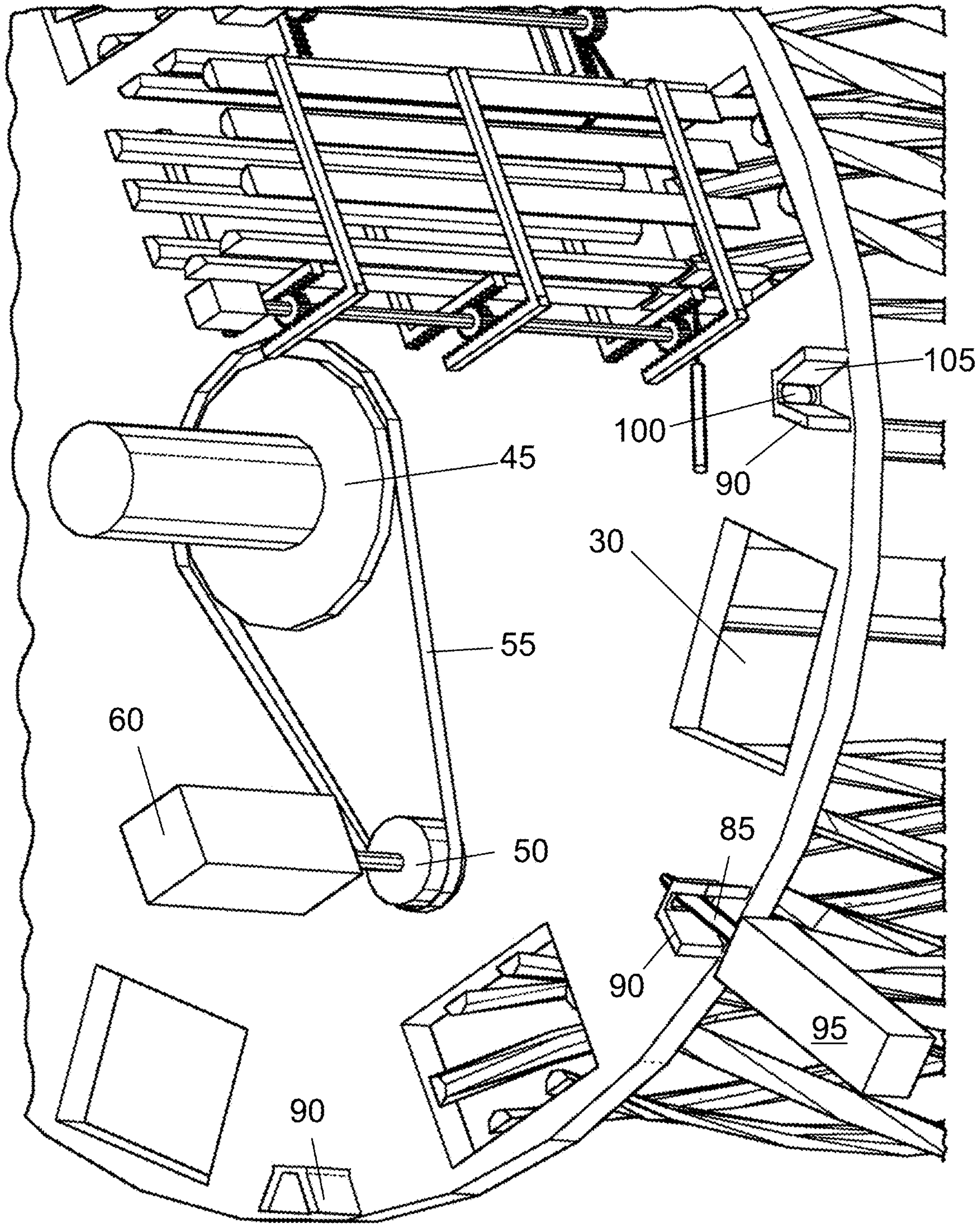
FIG. 8 is a partial perspective view of the system of FIG. 2 showing a turret locking pin and motor.
Figure 11:
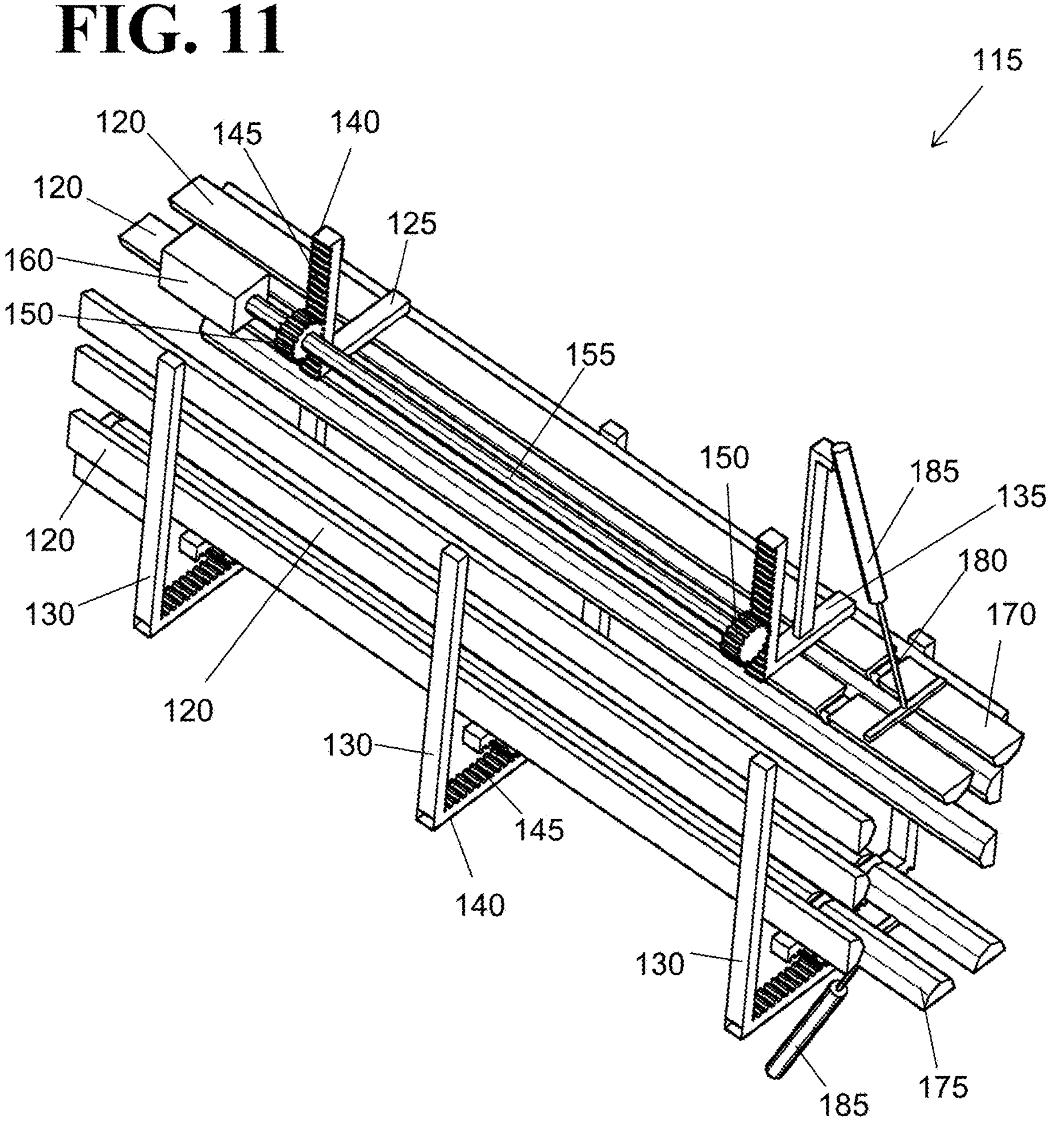
FIG. 11 is a perspective view of an isolated feed assembly of the system of FIG. 2.
Figure 12:
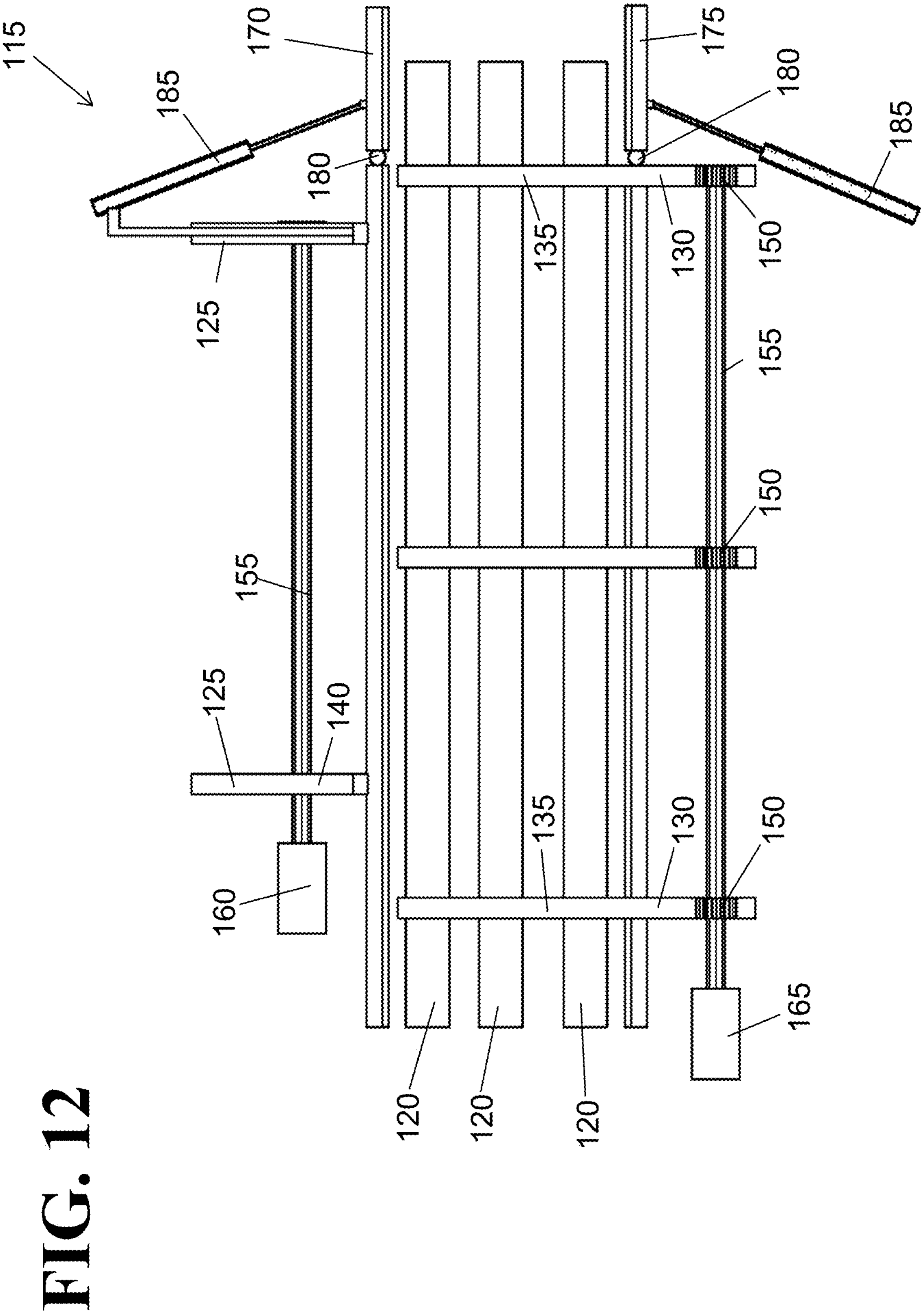
FIG. 12 is a side elevational view of an isolated feed assembly of the system of FIG. 2.
Figure 13:
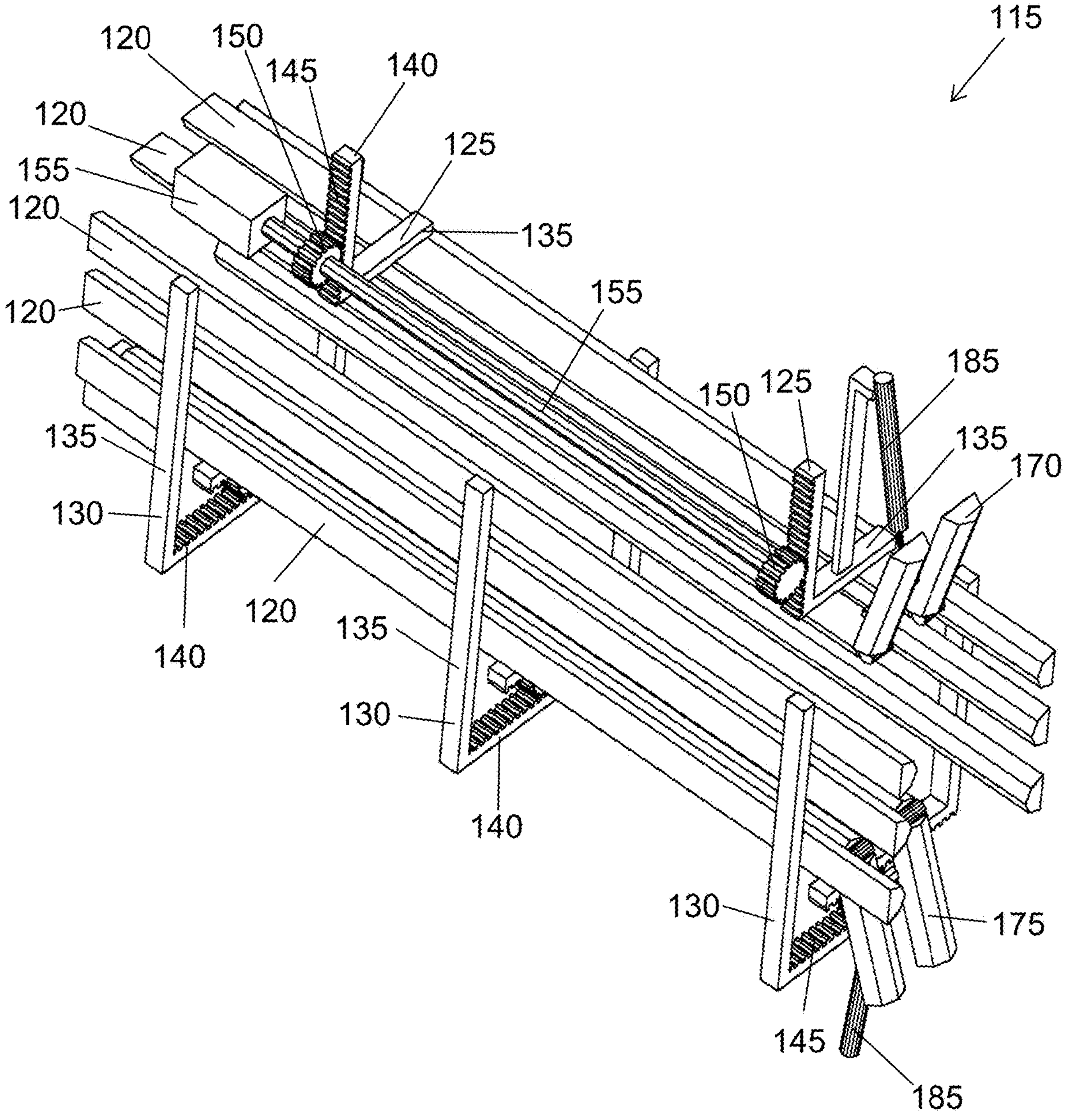
FIG. 13 is a perspective view of an isolated feed assembly of the system of FIG. 2 with the transfer bars actuated.
Figure 14:
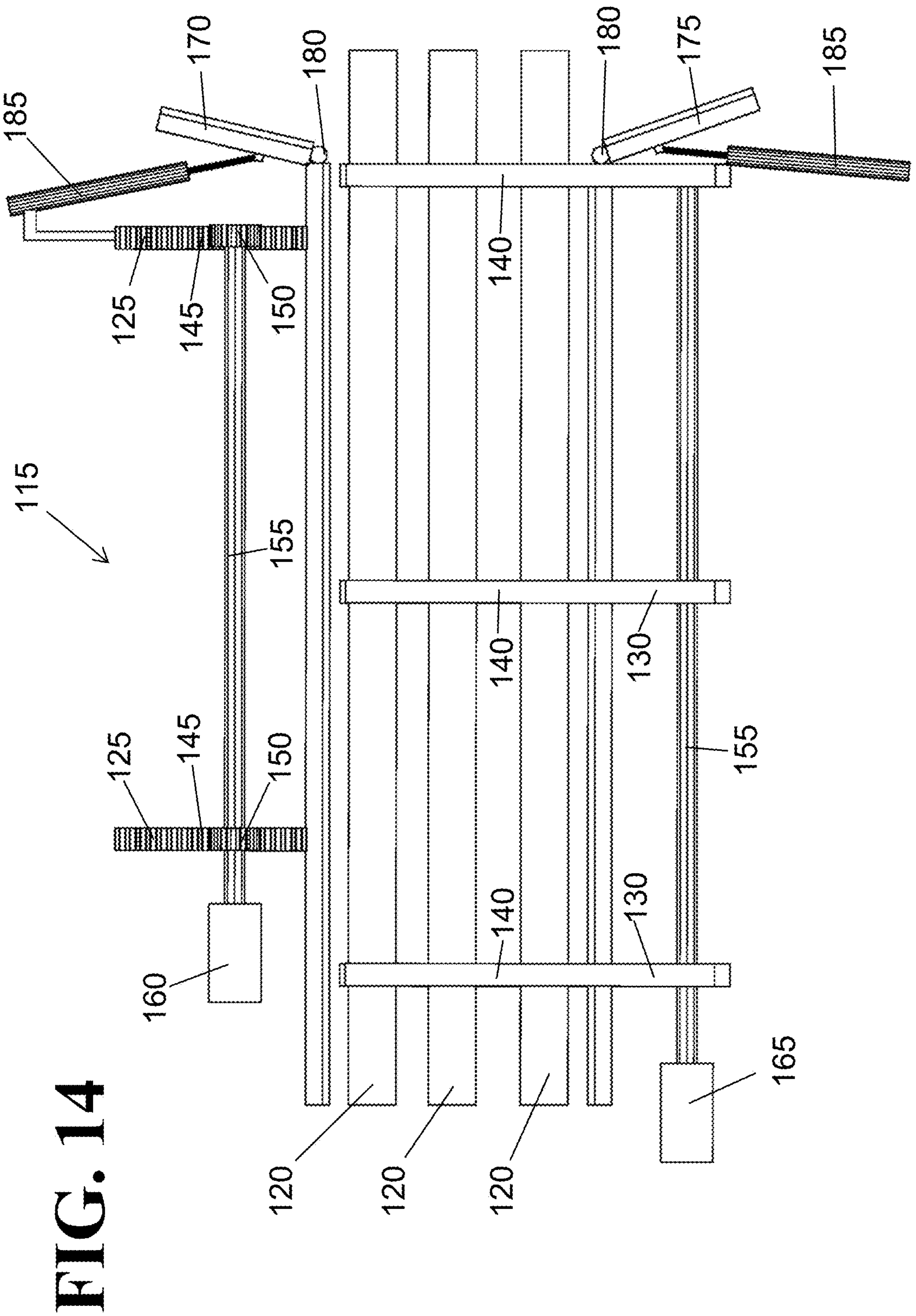
FIG. 14 is a side elevational view of an isolated feed assembly of the system of FIG. 2 with the transfer bars actuated.
Figure 15:
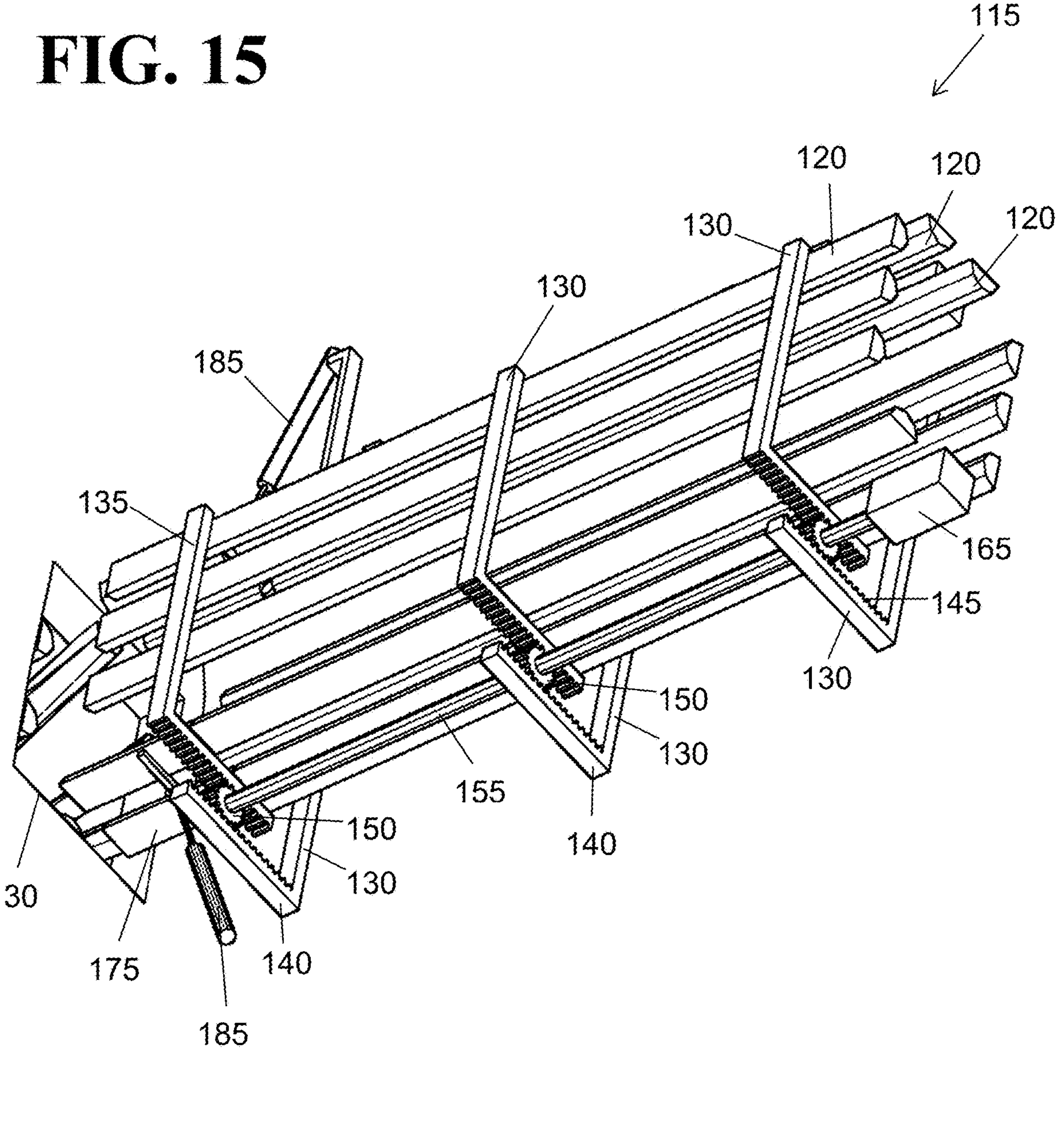
FIG. 15 is a lower perspective view of an isolated feed assembly of the system of FIG. 2.
Figure 16:
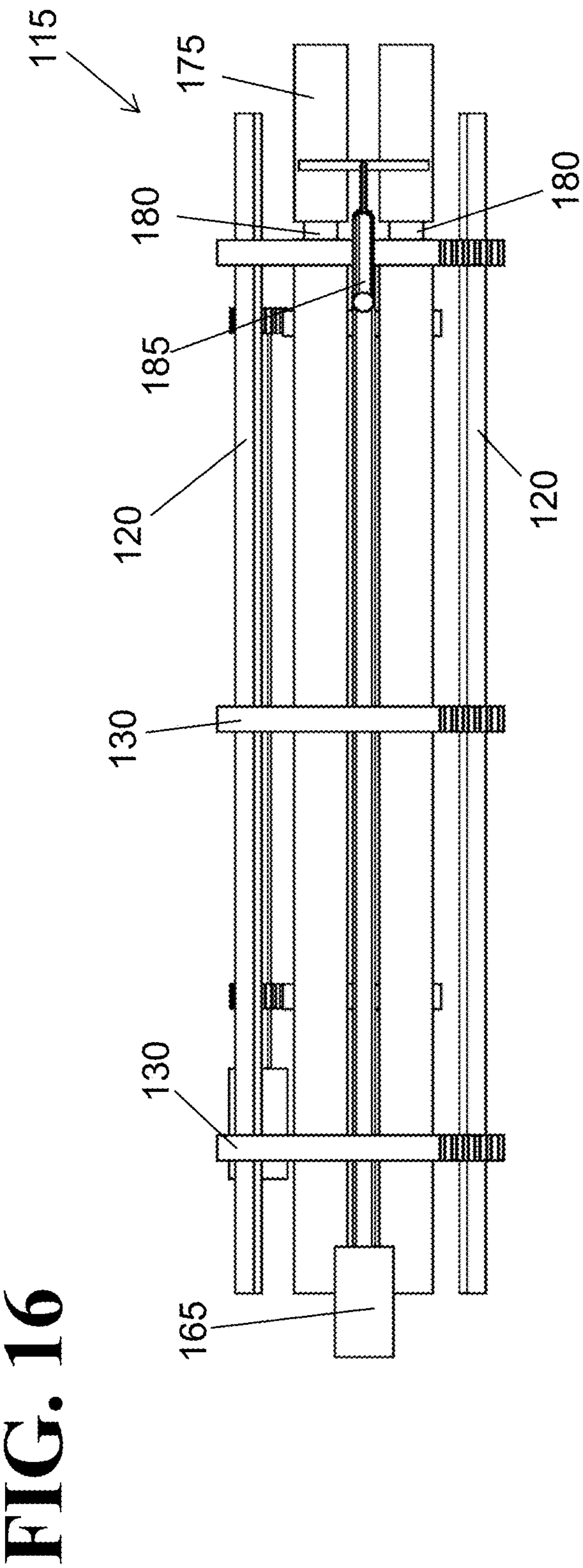
FIG. 16 is a bottom plan view of an isolated feed assembly of the system of FIG. 2.
Figure 17:
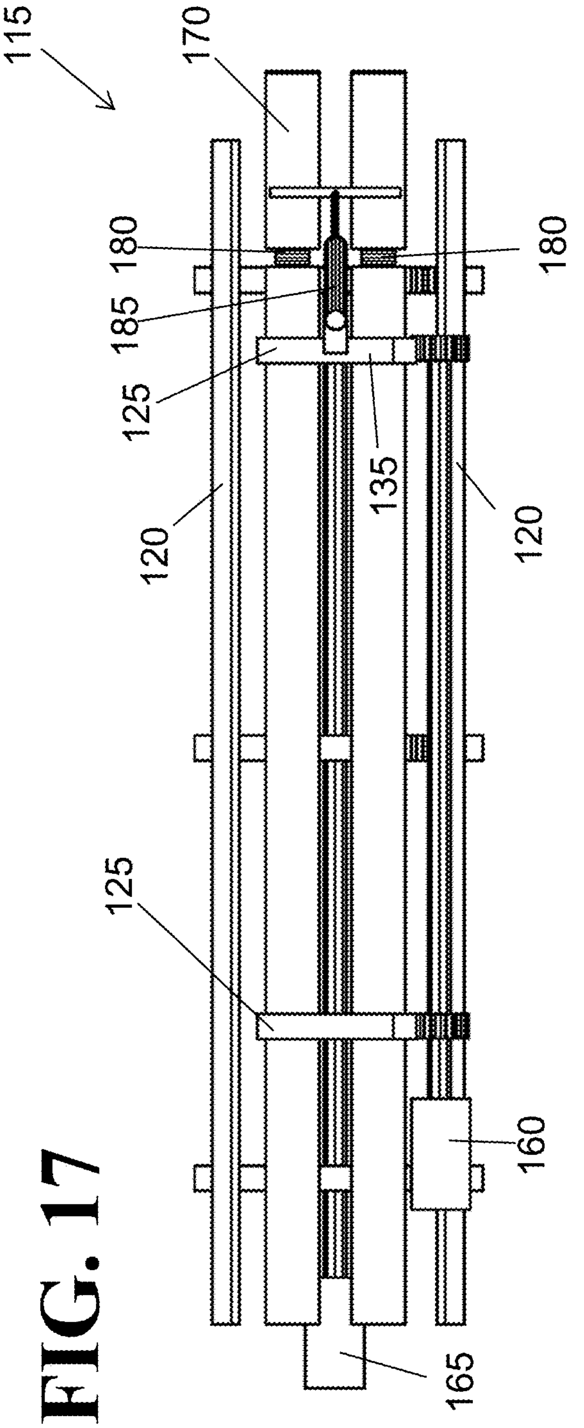
FIG. 17 is a top plan view of an isolated feed assembly of the system of FIG. 2.
Figure 18:
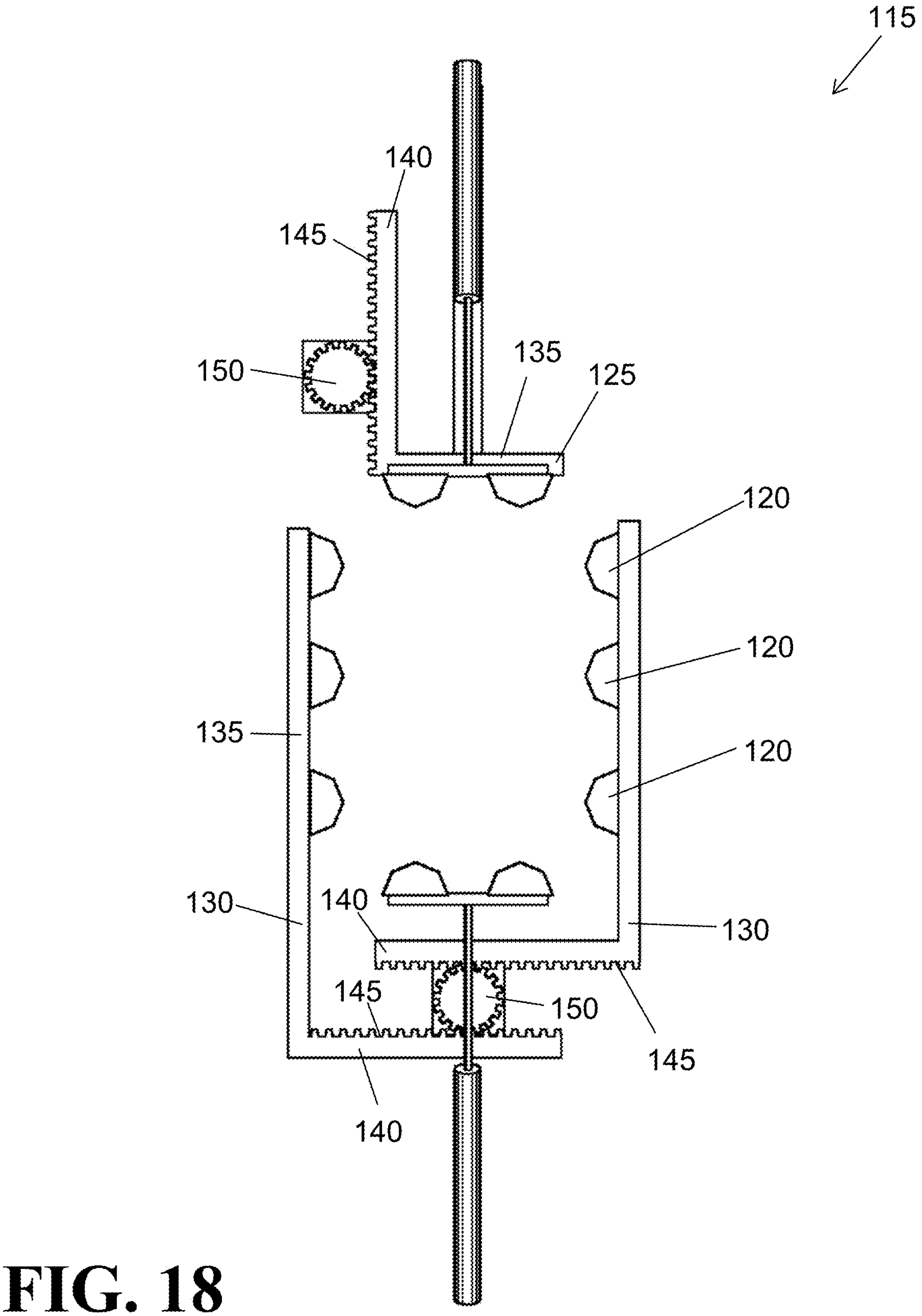
FIG. 18 is a front elevational view of an isolated feed assembly of the system of FIG. 2.
Figure 19:
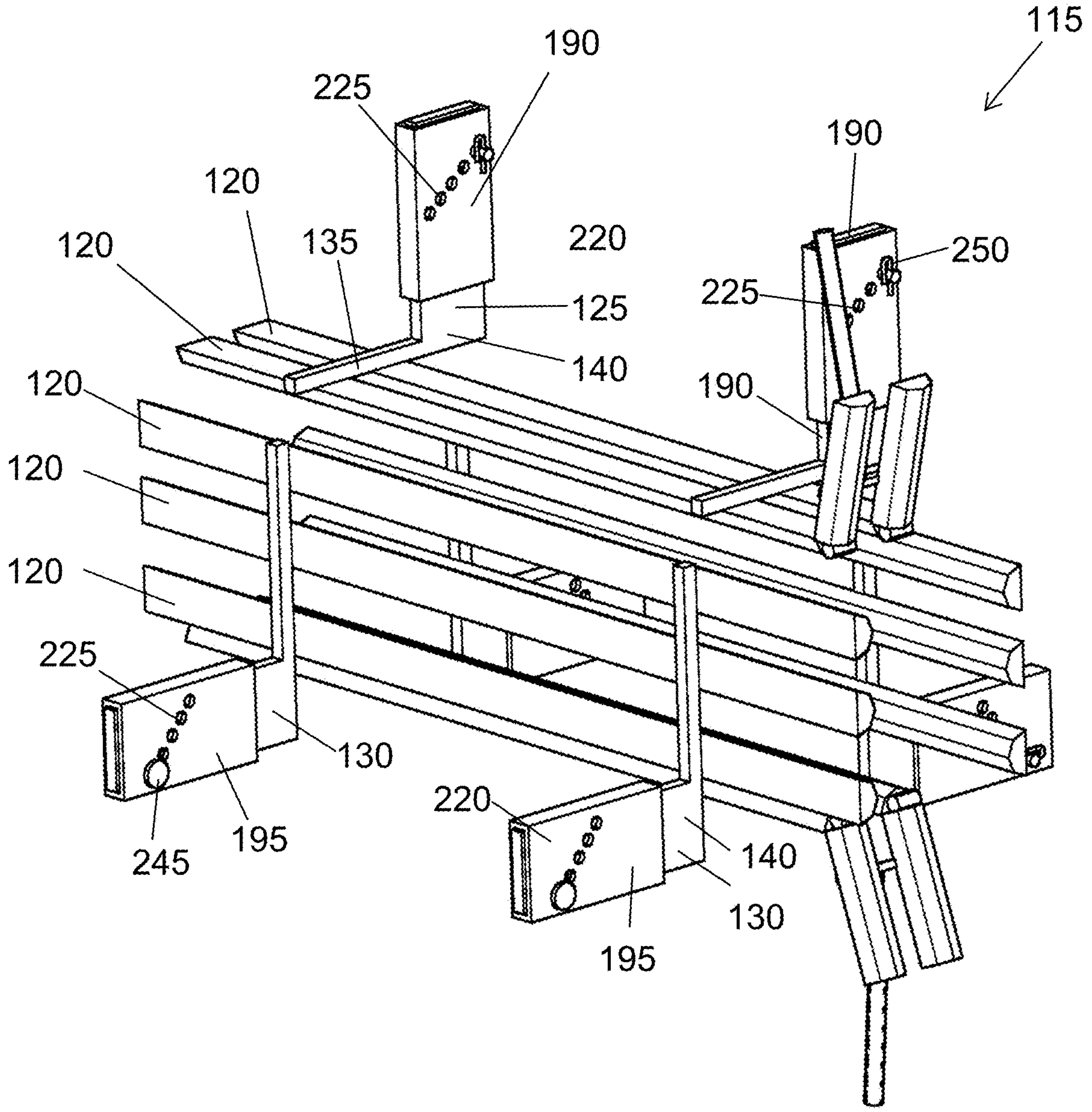
FIG. 19 is an isolated perspective view of a feed assembly with non-motorized quick-change adjusters.
Figure 20:
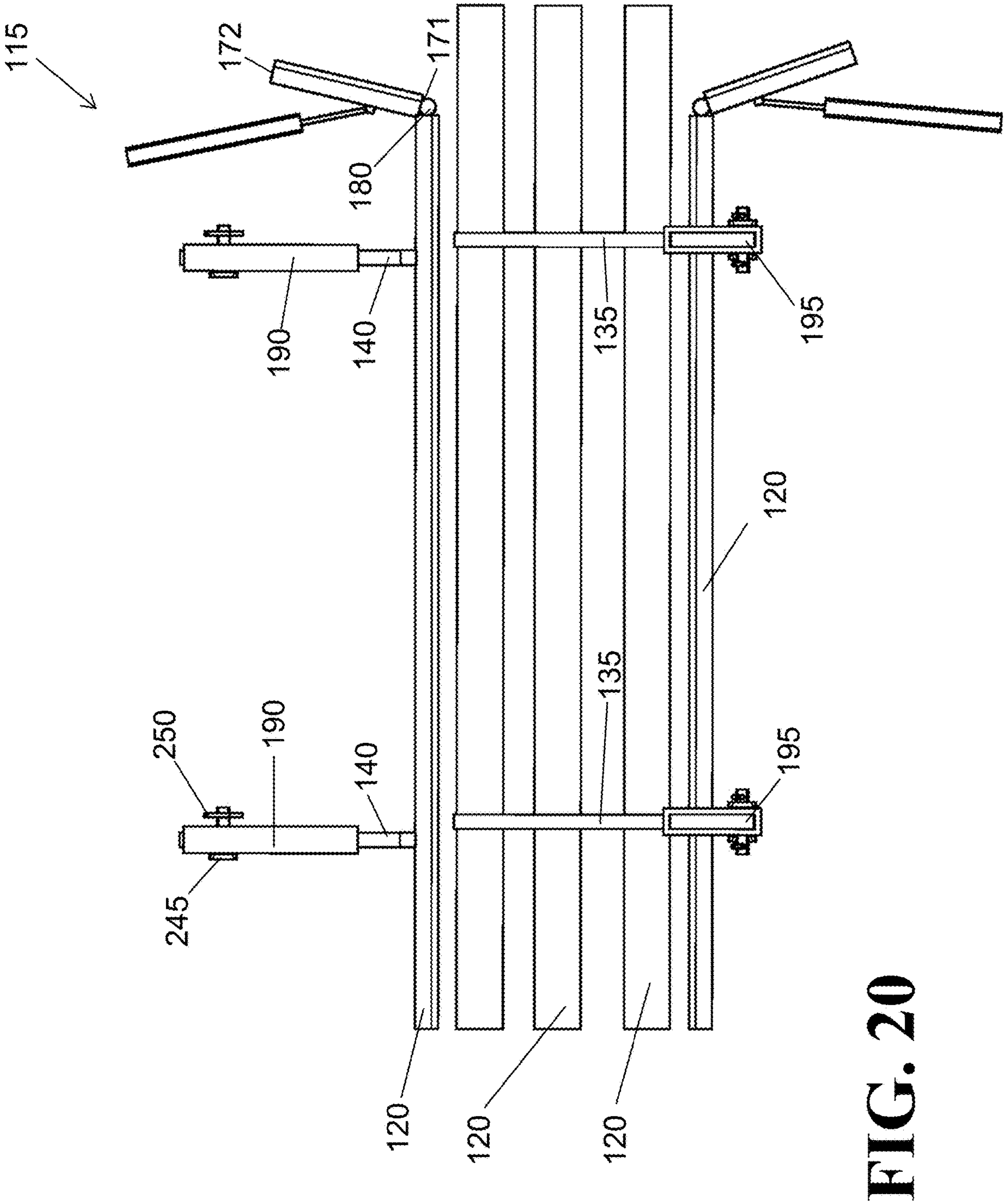
FIG. 20 is an isolated side elevational view of a feed assembly with non-motorized quick-change adjusters.
Figure 21:
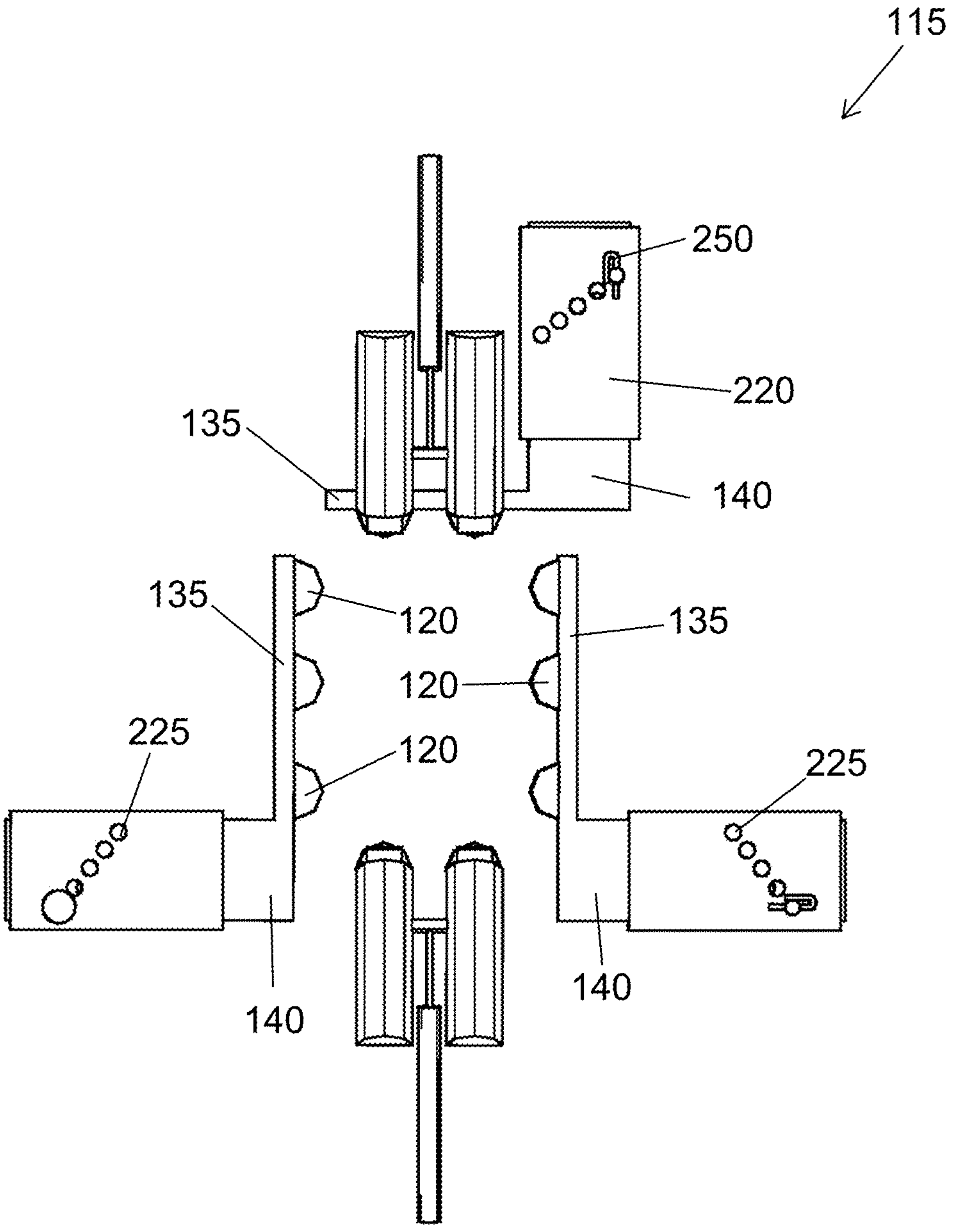
FIG. 21 is an isolated front elevational view of a feed assembly with non-motorized quick-change adjusters.
Figure 22:
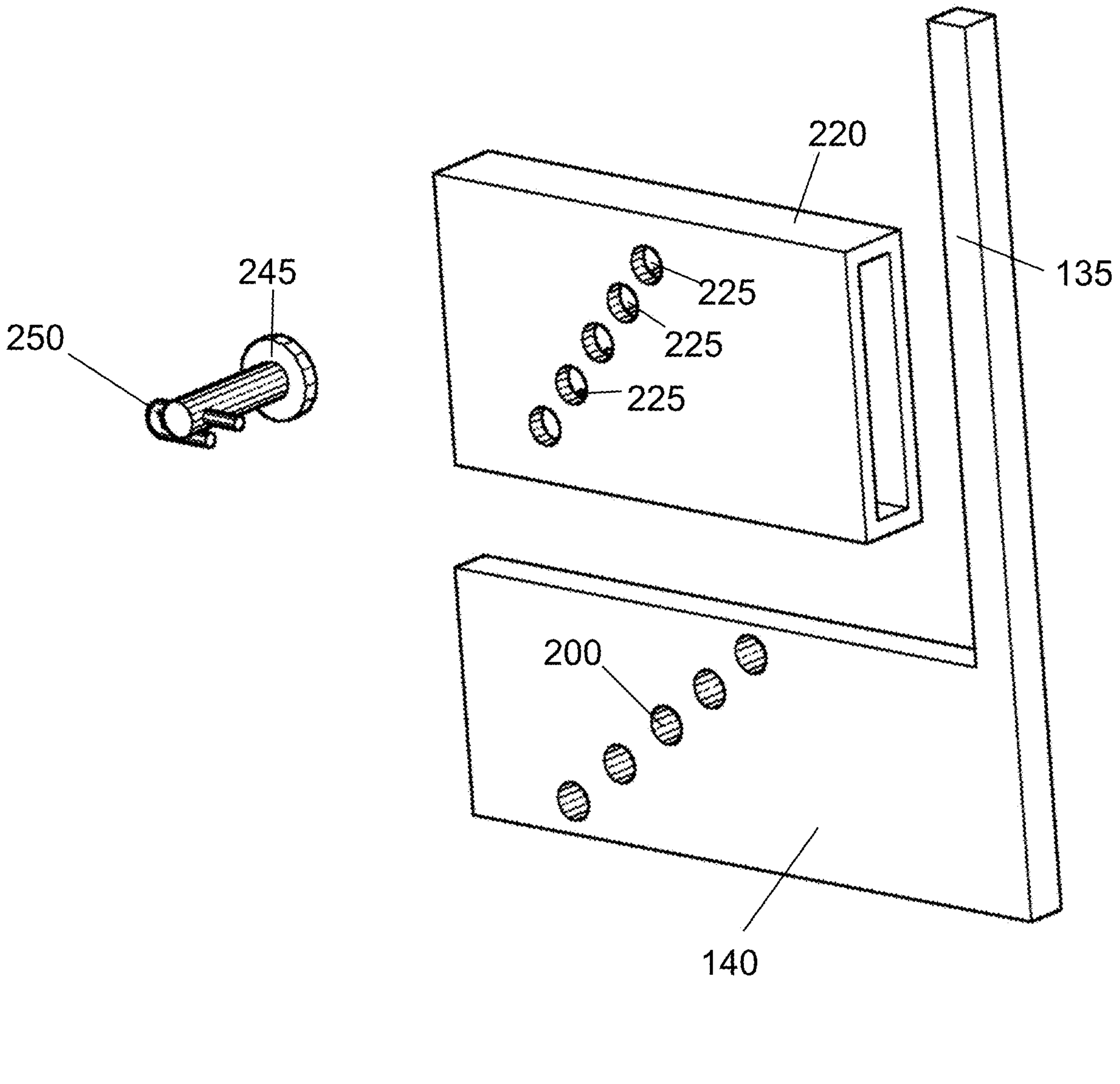
FIG. 22 is an isolated perspective view of a disassembled non-motorized quick-change adjuster.
Figure 23:
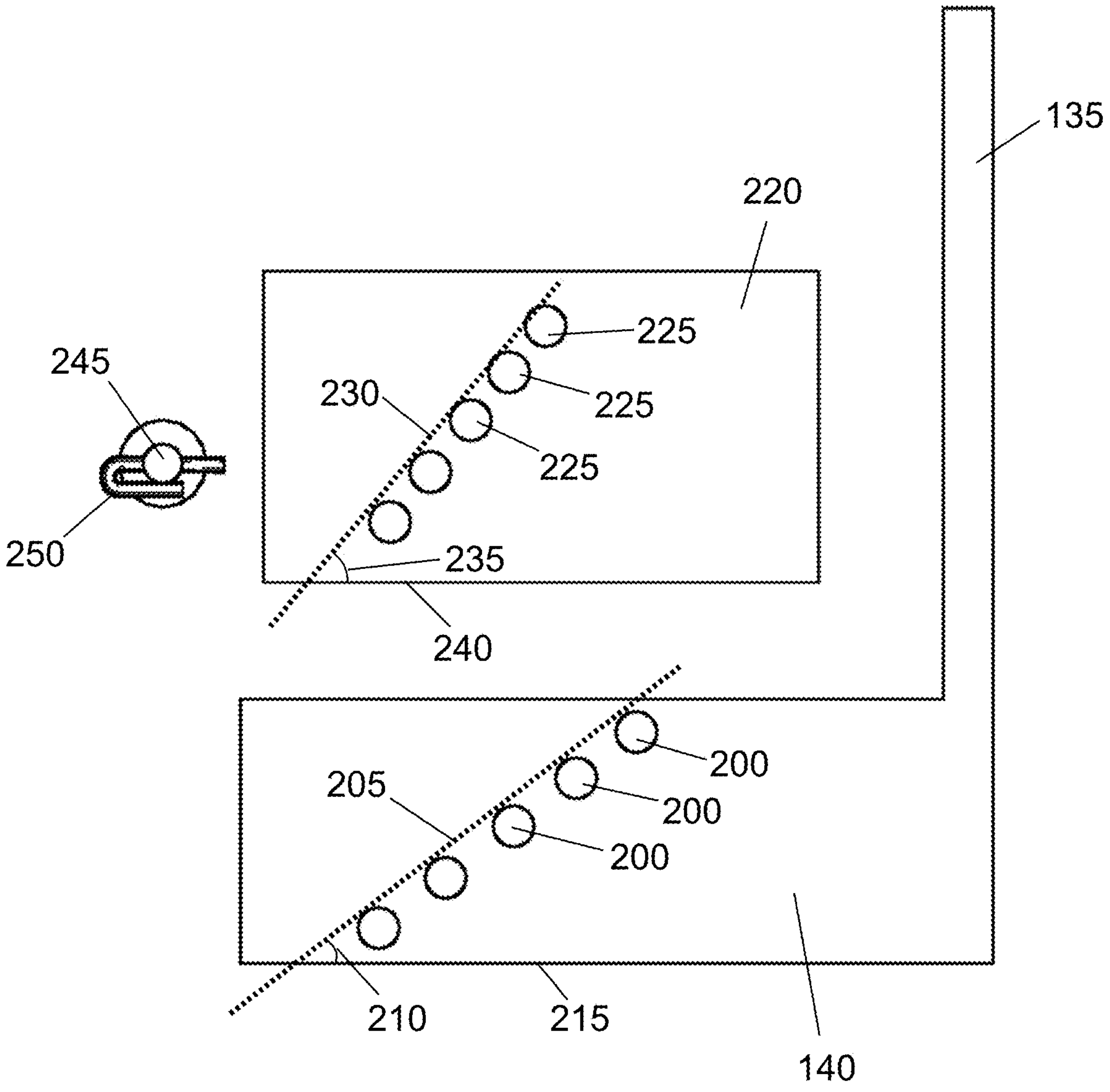
FIG. 23 is an isolated elevational view of a disassembled non-motorized quick-change adjuster.

To address these issues, U.S. Pat. No. 7,617,921 discloses a structure that "structurally includes an adjustable guide rail system for laterally adjustably guiding and axially rotatably manipulating containers, such as cans, passed axially between the guide rail systems and with structure to simply and easily facilitate adjustment of the system to adjust to various series of different size cans to guide multiple series of different size cans there through by rotating a cylinder through which the cans passed to present a different passage for each respective series of different size cans." FIG. 1 shows a representative illustration of the "Gatling Gun" system for can changeovers disclosed in U.S. Pat. No. 7,617,921. Illustrating an integrated can inverter with adjustable components to accommodate various size cans. The inverter rotates cans 180 degrees and is primarily used to invert cans before and after the warmer, cooler or code dater. The "Gatling Gun" system of the U.S. Pat. No. 7,617,921 has adjustable straight rails and a turret drum with twist fittings. Using a rack and pinion system, the height and width of straight rails can be adjusted to preset can sizes. The entire contents of U.S. Pat. No. 7,617,921 are herein incorporated by reference, and specifically the cylindrical style quick change system show in FIGS. 2-4 (and accompanying descriptions) and the guide assemblies shown in FIGS. 5-6 (and accompanying descriptions) are herein incorporated by reference.

While the system disclosed in U.S. Pat. No. 7,617,921 is a significant improvement over previous systems, there exists a need for even faster changeovers of can filling lines. At run speeds of up to 2,000 or more cans per minute, reducing the changeover time for a line by even a few minutes per changeover can result in substantial increases in productivity.

Product manipulation systems disclosed herein may be used with any type of conveyor system and is particularly suited for conveyor applications where multiple different sizes of a product are run through the conveyor. The improved can manipulation system may be used with many different products such as boxes, soda cans, soup cans, plastic bottles, glass bottles, and plastic bottles. However, for descriptive purposes, the product manipulation system will be described in use with aluminum cans. In other words, the methods, apparatus, and systems disclosed herein may be utilized with any type of object conveyed within a system such as containers (e.g., boxes, soda cans, soup cans, plastic bottles, glass bottles, metal containers, jars, etc.), manufactured parts, etc. The methods, apparatus, and systems disclosed herein are not limited to use with a particular object.

The various embodiments of the present disclosure overcome the shortcomings of the prior art. The present disclosure provides an automated system for changing over a can line. A rotating turret with multiple can twists is used to align various can twists with a production line. The rotation of the turret is motorized and includes a system for precisely measuring the rotation of the turret and locking the turret in place at preselected orientations. Feed assemblies with moveable guide rails and transfer bars are configured to receive product from, or pass product to, the twists on the turret. The horizontal and vertical movements of the feed assembly guide rails, and the transfer bars, may be motorized. Various measures are implemented to protect both the system from damage and operators of the system from injury.

FIGS. 2-5 show a motorized rapid changeover can manipulating system 10 having can manipulating turret 15 with a plurality of twists 20 (or straight rails) extending between two discs 25 or disc plates. The can manipulating system 10 is configured to orient a series of cans moving through the system 10. The twists 20 act to change the orientation of products passing through the can manipulation system. In the illustrated example, the twists 20 shown cause a 180-degree rotation of the products, however twists with other rotational amounts (or even a lack of rotation in the case of straight rails) may be mounted between the two discs 25.

Each of the twists 20 aligns with apertures 30 (or holes) in the disc 25 through which cans pass. The illustrated discs are each shown with eight apertures 30, however in an alternate embodiment each of the discs includes at least four aperture 30. Several different twists 20 are loaded on the turret 15 and can be brought into alignment with the conveyor system through rotation of the turret 15 about an axis of rotation 17 of the turret. A support brace 35 extends between the two discs 25 along the axis of rotation 17, and acts to keep the discs 25 in rotational alignment. Precise rotational alignment of the two discs 25 allows for a smooth flow of cans through the system at high speeds. Auxiliary supports 40 may also extend between the two discs 25 to further ensure rotational alignment between the two discs.

In the illustrated example, the support brace 35 is shown as a rectangular piece of metal having a size similar to that of a twist 20, however, in other embodiments of the disclosure, the support brace 35 may have other shapes such as octagonal, honeycomb, or even be constructed from several separate and distinct parts.

The components of the rapid changeover can manipulation system 10 are preferably constructed from resilient materials that can withstand the forces exerted by rapidly moving cans but that are also chemically resistant and can be sprayed down for cleaning. In an exemplary embodiment of the disclosure, discs 25, support brace 35, and auxiliary supports 40 are constructed from stainless steel while the twists 20 are constructed from polytetrafluoroethylene (PTFE) or UHMW (Ultra-High Molecular Weight) polyethylene covered stainless steel.

In a preferred embodiment of the disclosure, the discs 25 of the turret 15 are circular discs, however in other embodiments of the disclosure, the discs are other shapes such as an octagon, a hexadecagon (16-sided polygon), or a hexadecagram (16-pointed star). In operation of the system, the twists 20 are precisely aligned with the flow of products and the disc structures support the twists 20 without significant deflection or movement as the products are passed therethrough. As such, structures, such as a round disc, that provide significant support to the twists 20 are a preferred embodiment of the disclosure.

Rotationally secured to a disc 25 of the turret 15 is a primary sprocket 45 connected to a secondary sprocket 50 driven by a drive chain 55. A turret motor 60 rotates the secondary sprocket 50 to move the turret 15 and select the twist 20 in use by the system. In the illustrated example, the secondary sprocket 50 is substantially smaller than the primary sprocket 45, such that numerous rotations of the secondary sprocket are required to complete a single rotation of the primary sprocket 45. This provides for precise control of the rotation of the primary sprocket 45 and the rotationally locked turret 15. In one embodiment, the primary sprocket 45 has 20 times more teeth than the secondary sprocket 50. Additionally, to further improve the rotational control of the turret 15, the turret motor 60 may be a servomotor, a stepper motor, or other type of motor that allows for precise rotational control of the motor.

On the opposite side of the turret 15 from the primary sprocket 45 and aligned with the rotational axis 17 is a measurement sprocket 65 that is rotationally locked to the turret 15. The measurement sprocket 65 has a plurality of grooves 70. A measurement laser system 75 passes a laser between two posts 80 on the laser system. The measurement sprocket 65 passes between the posts 80 and intermittently interrupts or blocks the laser based on the spacing of the grooves 70. By recording the number of times the laser is interrupted, a precise rotational angle of the turret may be determined. A computer control system may correlate the number of interruptions to the precise rotational angle of the turret.

FIGS. 3-7, 9*a*, 9*b*, and 10 show a turret locking pin 85 secured in a receiver 90 on a disc 25. In the illustrated example, a pneumatic cylinder 95 acts to move the turret locking pin 85 through an aperture 100 in the receiver 90. In alternate embodiments of the disclosure other means, such as a linear actuator, are used to move the turret locking pins. On opposites sides of the aperture 100, the receiver has angled guide slopes 105 that align the receiver 90 with the turret locking pin 85 when it is actuated by the pneumatic cylinder 95. The receivers 90 are secured to the disc 25, and the turret locking pin 85 pressing against the guide slopes 105 causes the turret 15 to rotate into a precise predetermined position that aligns a twist. Once the turret locking pin 85 passes through the aperture 100, the locking pin 85 prevents rotation of the turret 15. The pneumatic cylinder 95 is secured to a frame (not shown) of the system. Additionally, an interlock system may be used to prevent the disc motor 60 from being operated while the turret locking pin 85 is secured in a receiver 90.

As shown in FIGS. 4-8, there are numerous receivers 90 located about the outer perimeter or circumference of the discs 25 to lock the turret 15 into a plurality of predetermined orientations so that the various twists may be used. Shown in FIG. 9*b* is a receiver 90 that is connected to a disc via a translational positioner 110. The positioner 110 allows the receiver 90 to be moved along a small path adjacent to the outer perimeter of the disc. The positioner 110 generally moves the receiver perpendicular to a radius of the disc. By making slight changes to the position of the receiver 90, ultra-fine adjustments to the rotational orientation of the turret may be made. In the illustrated example, the number of holes or apertures 30 in a disc 25 is equal to the number of receivers 90 secured to the disc 25.

In the illustrated examples, two turret locking pins 85 are shown securing turret 15 in predetermined rotational orientations. However, additional locking pins or fewer locking pins may be utilized based on the needs of the system. In one example, only a single locking pin is used on one of the turret discs to lock the turret into place. In another example, two locking pins are used on each disc so that a total of four pins act to rotationally secure the turret.

Figure 2:
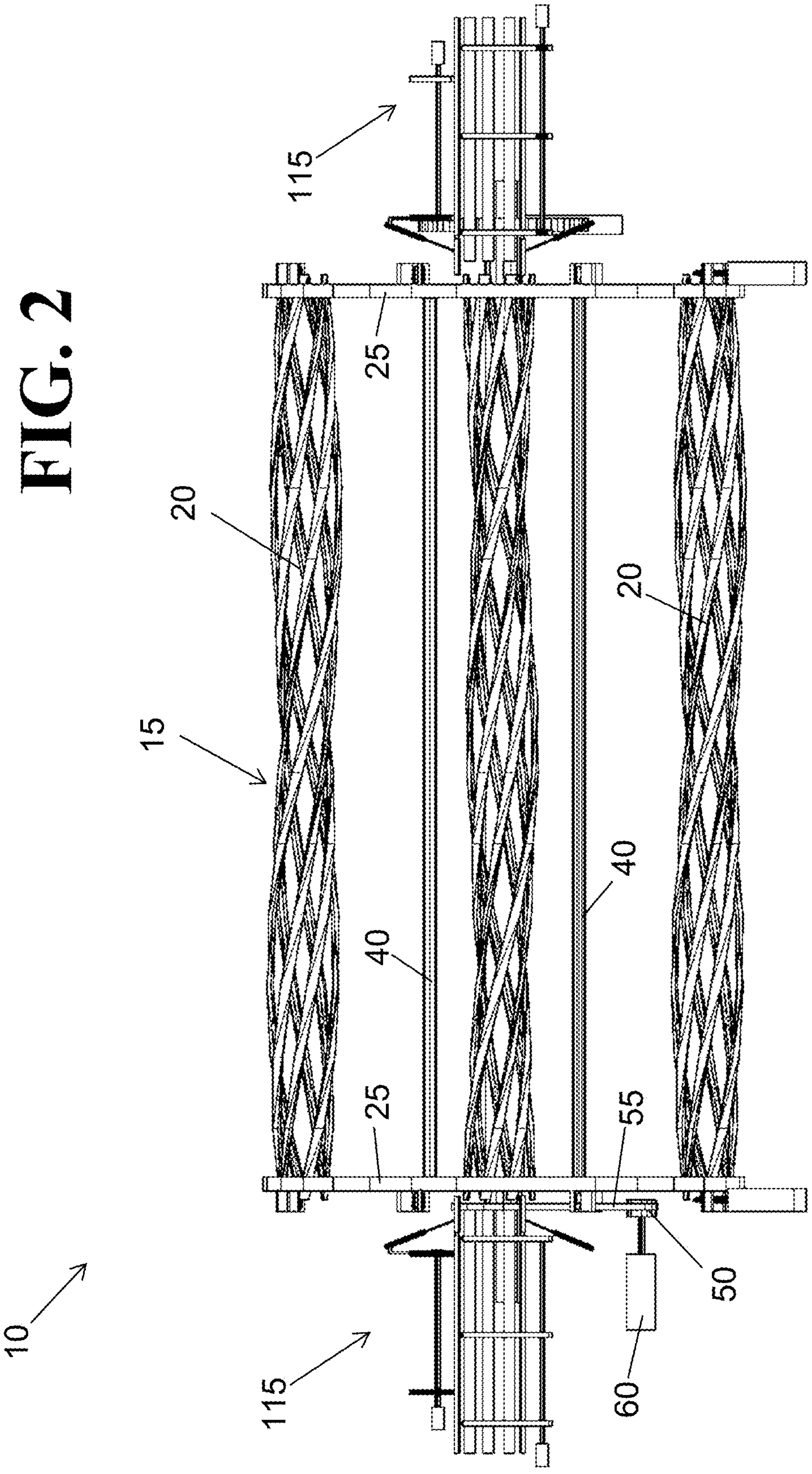
FIG. 2 is a side elevational view of a rapid changeover can inverter with adjustable components.
Figure 3:
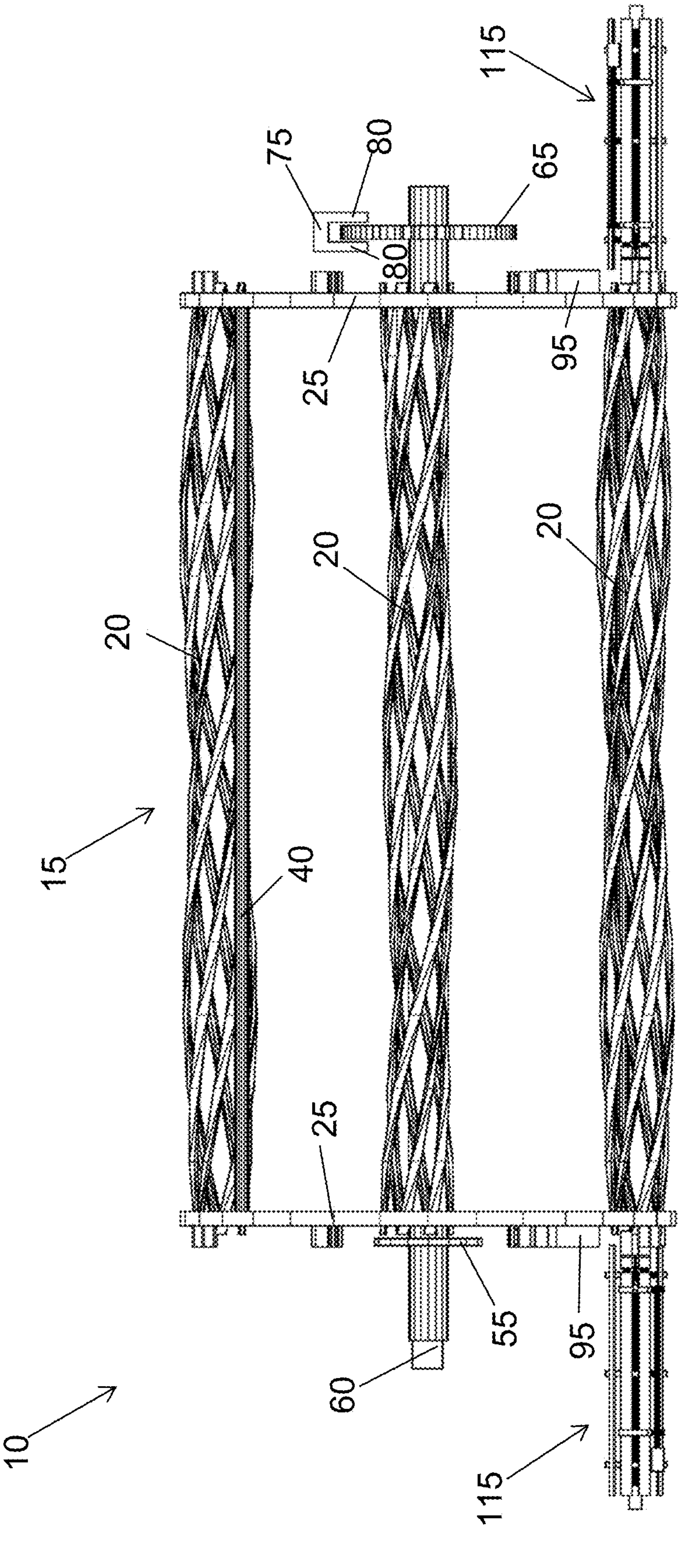
FIG. 3 is a top plan of the system of FIG. 2.
Figure 4:
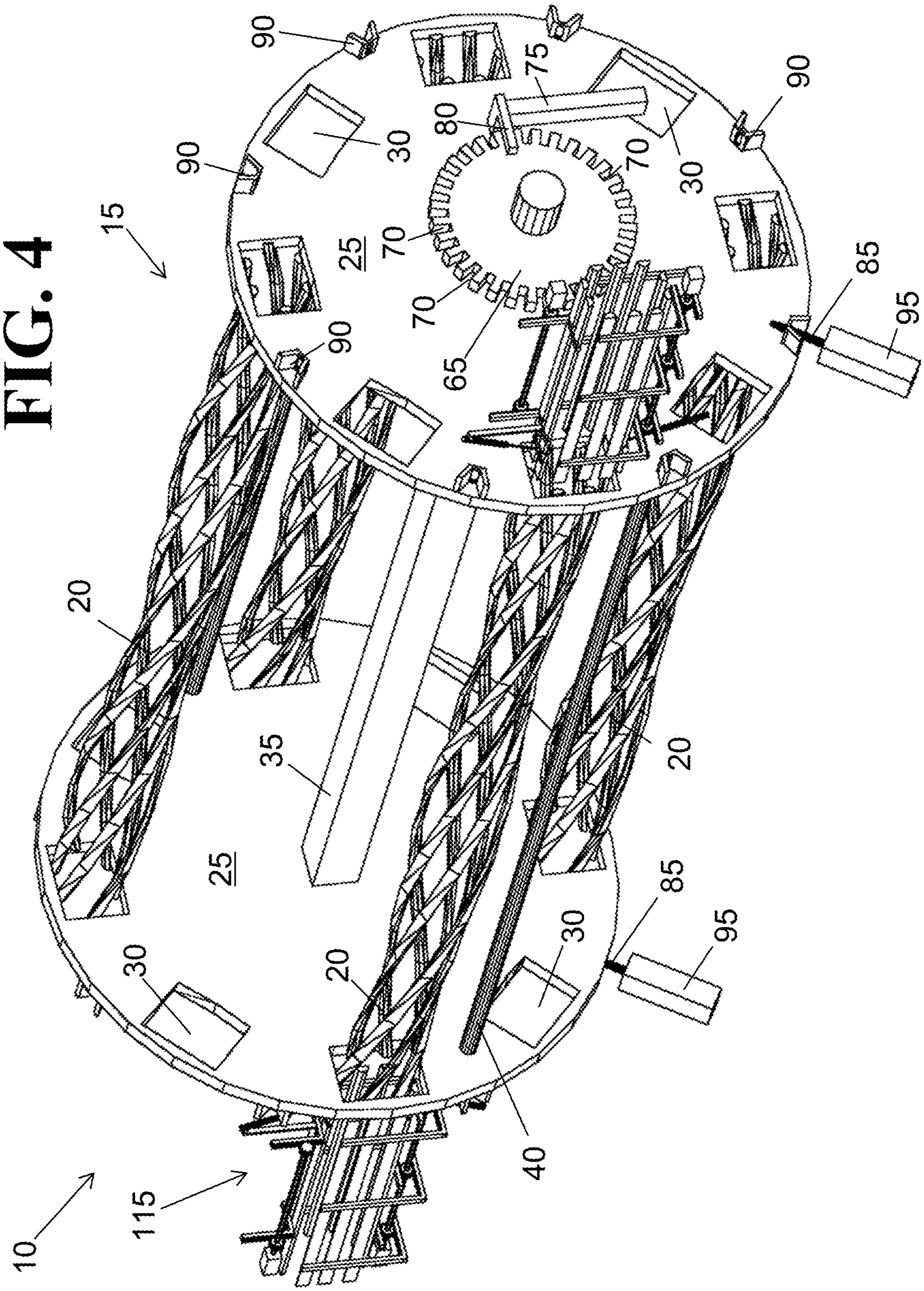
FIG. 4 is a back perspective view of the system of FIG. 2.

Shown on either side of the turret in FIGS. 2-4, and in isolation in FIGS. 11-18, are can feed assemblies 115 that pass product to, or receive product from, the turret 15. Each of the illustrated feed assemblies 115 include a plurality of guide rails 120 adapted to contact the product as it passes through the product manipulation system. Like the rails of the twists, in an exemplary embodiment the guide rails 120 are stainless steel with UHMW or PTFE coverings. In the illustrated example, each can feed assembly 115 has two guide rails 120 above the product, two guide rails 120 below, and three guide rails 120 on either side of the product. The two guide rails 120 above the product are shown as being vertically adjustable, the three guide rails 120 on either side of the product are shown as being horizontally adjustable, and the two guide rails 120 below the product are stationary (e.g., stationary guide rails). In alternate embodiments of the disclosure, there are between two and five guide rails on either side of the product and between one and three guide rails above and below the product. In one embodiment of the disclosure, there are four guide rails on either side of the product and one guide rail above and below the product.

The top and side guide rails 120 are supported by vertical/top mounts 125 or horizontal/side mounts 130, respectively. Each of the mounts (125, 130) includes an L-shaped structure with a first arm 135 secured to guide rails 120 and a perpendicular second arm 140 having a rack structure 145. Connected to the rack structures 145 are pinions 150 rotated by a shaft 155. Each shaft 155 may connect to multiple pinions 150 so that each of the guide rails 120 is supported by multiple mounts (125 or 130). A height motor 160 rotates the shaft 155 connected to the top mount 125 while a width motor 165 rotates the shaft connected to the side mounts 130. In the illustrated example, two side mounts 130 are connected to each pinion 150 driven by a width motor 165. The rack structure 145 of the first side mount 130 contacts the top of the pinion while the rack structure of the second side mount contacts the bottom of the pinion 150. Thus, when the pinion 150 rotates the first and second side mounts 130 move in opposite directions. The height motor 160 and its associated shaft 155, pinions 150, and rack structure 145 are herein collectively referred to as a vertical actuator. The width motor 165 and its associated shaft 155, pinions 150, and rack structure 145 are herein collectively referred to as a horizontal actuator.

The height and width motors (160, 165) act to adjust the spacings of the guide rails 120 to accommodate a variety of different product sizes. The motors (160, 165) are computer controlled to automatically adjust to guide rail 120 spacing during a changeover operation based on the size of the new product to be run through the conveyor system.

Upper transfer bars 170 and lower transfer bars 175 are connected to the guide rails 120 via hinges 180. The transfer bars (170, 175) may also be referred to as conduction bars, and the lower transfer bars 175 are shown as being directly below the upper transfer bars 170. Pneumatic actuators 185 are secured to transfer bars (170, 175) and act to rotate the transfer bars about the hinges 180. The transfer bars (170, 175) have first ends 171 adjacent to the guide rails 120 and hinges 180, and an opposite second end 172 adapted to be positioned adjacent to a twist 20 when the can manipulation system is operating. In the illustrated example, the pneumatic actuator 185 that operates the lower transfer bar 175 is secured to a frame (not shown) of the can manipulation system 10. The pneumatic actuator 185 that operates the upper transfer bar 170 is secured to the first arm 135 of a top mount 125 such that the when the first arm 135 is raised or lowered via rotation of the pinion 150 the pneumatic actuator 185 will also be raised or lowered with the guide rails 120 secured to the top mount 125. In the illustrated example, the first ends 171 are a first distance from the disc when the system is configured to pass cans and the transfer bar is in a first extension configuration. The first ends 171 are a second distance from the disc when the turret is to be rotated and the transfer bars are in a second extension configuration. The second distance is greater than the first distance. When the system is configured to pass cans, the first and second ends (171, 172) of the transfer bars (170, 175) are inline with their respective guide rail of the can feed assembly 115.

In the illustrated example, when the can manipulation system is in operation, the first and second ends (171, 172) of the transfer bars (170, 175) are aligned such that the transfer bar is parallel to the guide rail 120 and acts as an extension of the guide rail 120. Before the turret is rotated, the second end 172 of the transfer bar (170, 175) is moved away from the disc 25 of the turret such that the transfer bar (170, 175) is not damaged by rotation of the turret. In the illustrated example, the transfer bars are moved away from the disc using a hinge, however other systems may be used to move the transfer bars. In one example, the transfer bars are slightly offset, but coplanar with, the guide rails and the transfer bars slide back and forth to extend or retract to the disc. In yet another embodiment, the transfer bars have an accordion structure that can increase or decrease the length of the transfer bar to retract the transfer bar away from the twist or disc.

When the pneumatic actuators 185 (or bar actuators) extend the transfer bars (170, 175), the transfer bars extend adjacent to, into, or through the apertures 30 in the discs of the turret. By bringing the transfer bars (170, 175) into close alignment with the twists 20, disruptions at the transfer bar-twist interface are minimized so that the products may be run through the system at high speed. Rotation of the turret 15 with the transfer bars (170, 175) extended can cause damage to the transfer bars and/or the turret 15. To prevent damage, interlocks are utilized to ensure that the transfer bars are retracted before the turret is allowed to rotate. In an exemplary embodiment of the disclosure, the pneumatic cylinders 95 associated with the moveable locking pins are linked to the pneumatic actuator 185 of the transfer bars so that the transfer bars may only be extended down when the locking pins are engaged, and the locking pins may not be disengaged until the transfer bars are retracted. In one embodiment, a single compression source (e.g., source of pressurized air, oil, etc.) is used to operate or power both the pneumatic cylinders 95 and the pneumatic actuator 185. The amount of pressure needed to operate the pneumatic cylinders 95 is different than the pneumatic actuator 185 so that pneumatic actuator 185 retracts the transfer bars 170 before the pneumatic cylinders 95 disengage the locking pins. The term "threshold pressure" is herein defined as the pressure needed to cause actuation, operation, or movement of a pneumatic device. In the illustrated example, the threshold pressure of the pneumatic actuator 185 is different than the threshold pressure of the pneumatic cylinders 95. In an alternate embodiment, a single compression source sends air or liquid to the pneumatic cylinders 95 and the pneumatic actuator 185 via an interlock system that only passes fluid/air to the pneumatic cylinders 95 after the pneumatic actuators 185 have been moved.

FIGS. 19 through 23 illustrate feed assemblies 115 having manual quick-change adjusters for the guide rails 120. The vertical manual adjusters 190 connect to the top mounts 125 while horizontal manual adjusters 195 connect to the side mounts 130. In the illustrated examples the manual adjusters are shown as being integrally formed with their mounts (125, 130), but in other embodiments of the disclosure the manual adjusters (190, 195) are separate and distinct from the mounts (125, 130). As with the previous embodiments, in the illustrated example, the first arm 135 of the mounts (125, 130) is secured to the guide rails 120. Rather than having a rack structure, the embodiment shown in FIGS. 19-23 has mounts (125, 130) with enlarged second arms 140 that interact with the vertical or horizontal adjusters (190, 195). The second arms 140 include a plurality of holes 200 generally arranged along a first line 205 set at a first angle 210 to the length 215 of the second arm 140. Similarly, the manual adjusters (190, 195) include a pocket 220 adapted to receive the enlarged second arm 140. The pocket 220 is secured to a frame of the system (not shown).

Either side of the pocket 220 has complimentary holes 225 that are the same diameter as the holes 200 of the second arm 140. The complimentary holes 225 are generally arranged along a second line 230 that is at a second angle 235 to the length 240 of the pocket 220. The first and second angles (210, 235) are not identical such that each set of holes (200, 225) is in alignment when the pocket 220 and second arm 140 are at different positions relative to each other. When a set of holes (200, 225) is in alignment, a locking shaft 245 may be passed through the sets of holes (200, 225) and then locked into place with a cotter pin 250.

In the illustrated example, there are five holes (200, 225) that correspond to five distinct positions for the second arm 140 relative to the pocket 220. By aligning a predetermined set of holes, the first arm 135 and accompanying guide rails 120 may be quickly and precisely moved to a predetermined location such that spacing of the guide rails in the feed assemblies is quickly adjusted to accommodate a different size of product. Each of the five sets of holes may correspond to a predetermined size of product (e.g., 12 oz can, 8 oz can, etc.). While a changeover using the manual quick-change adjusters shown in FIGS. 19-23 is expected to take longer than the motorized system shown in FIGS. 2-18, the manual quick-change adjusters offer improved changeover times and may be available at a lower cost than a motorized system. The pocket 220, locking shaft 245, and enlarged perpendicular second arm 140 may be collectively referred to as either a vertical or horizontal actuator based on the guide rails they move.

Figure 24:
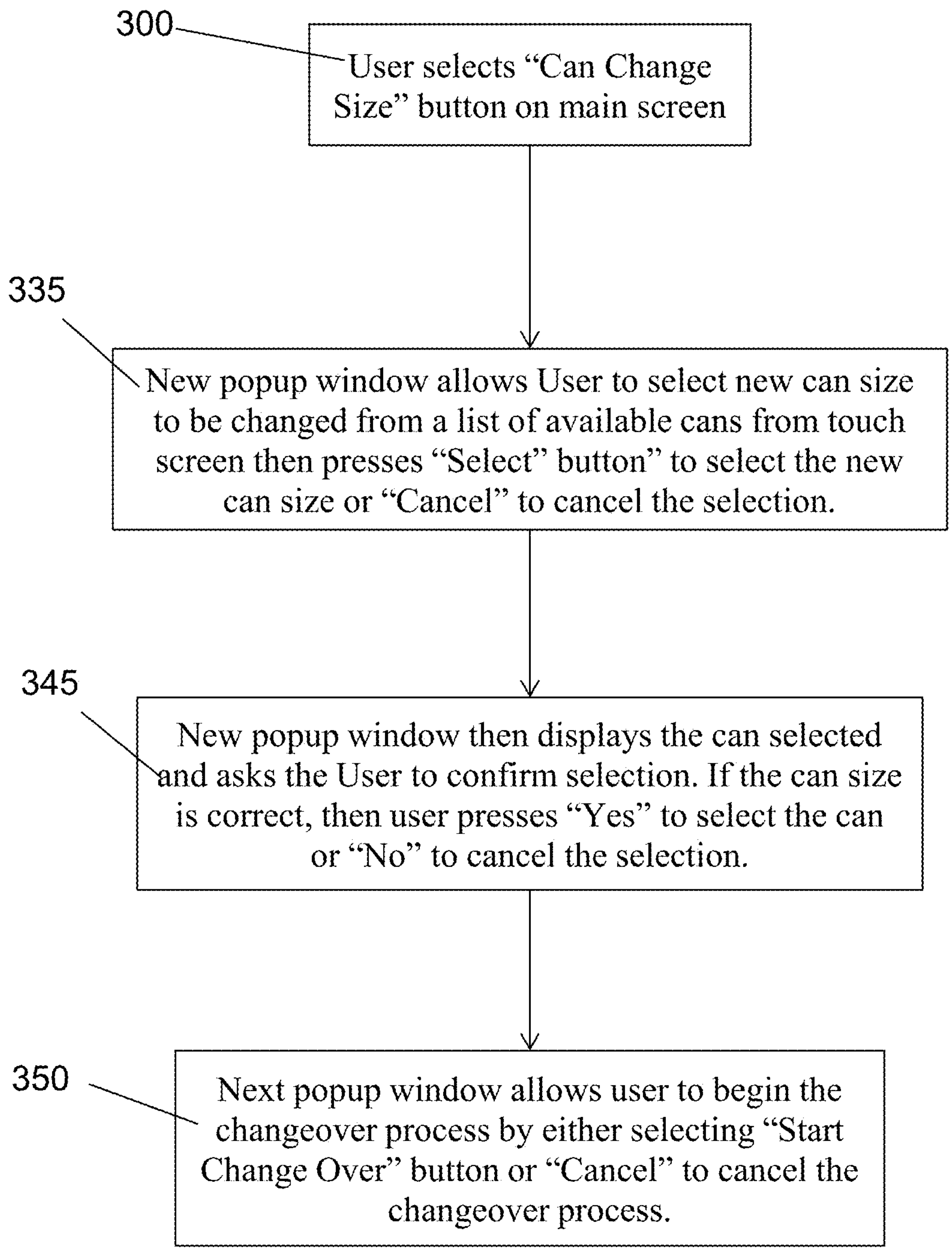
FIG. 24 is a flow chart of a can changeover operation using a computer control system.
Figure 25:
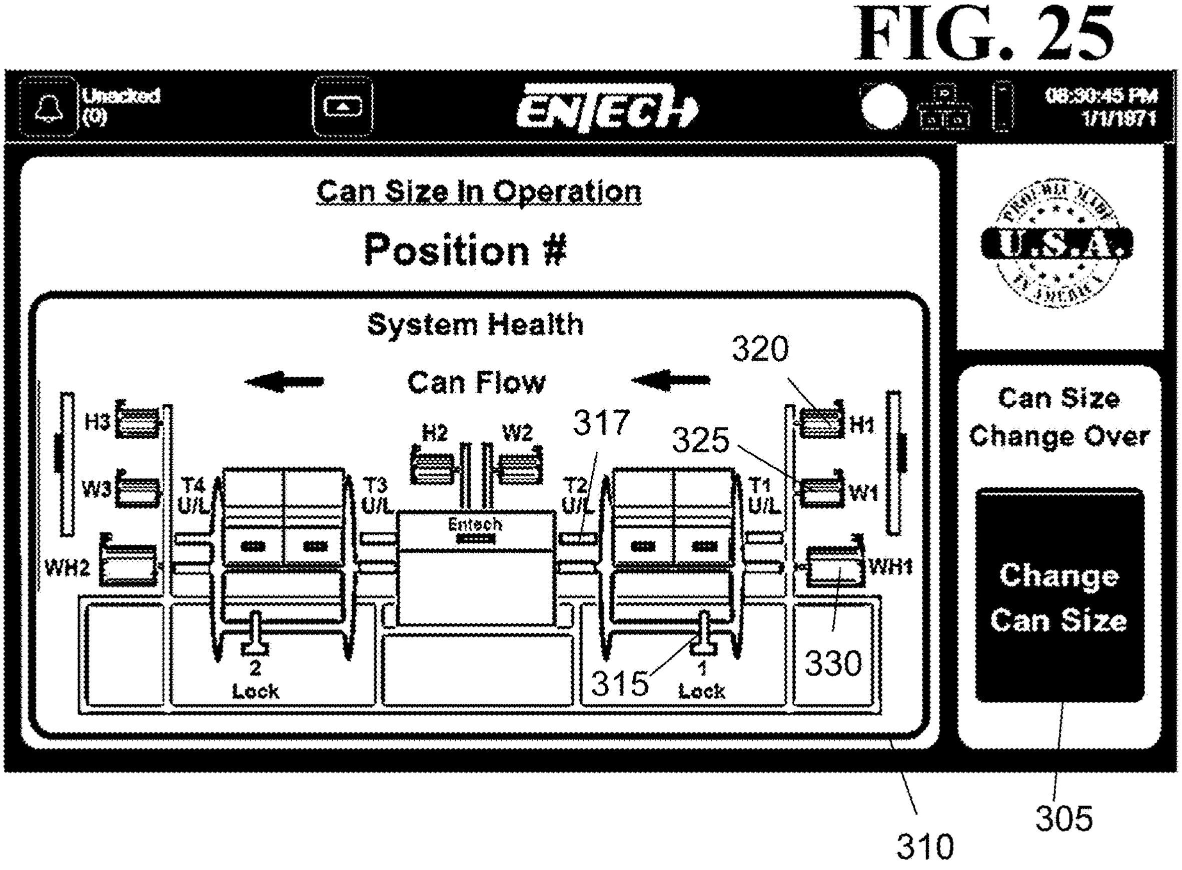
FIG. 25 is an illustration of a status screen for monitoring the system of FIG. 2.

FIG. 24 is a flow chart of using a computer control system for a can changeover operation. In the first step 300 a user selects "Change Can Size" on a main screen to initiate the changeover operation. FIG. 25 shows an exemplary embodiment of a main screen where a user may select to change the can size. Adjacent to the select "change can size" button 305 is an operational status screen 310 that provides the operator information relating to the status of the system. Icons display the status of the locking pins 315 and transfer bars 317 the height and width motors (320, 325) of the feed assemblies, and the disc motor 330 that rotates the turret to bring a selected twist into alignment with the feed assemblies. With the operational status screen 310, an operator of the system is able to observe that the system is ready for a can changeover, and also observe the status of the system during the changeover process. In one embodiment of the disclosure, the icons that represent the various components of the system change colors (e.g., go from red to green) in the operational status screen 310 based upon their state in the system. For example, if a motor is moving it may be shown in red and once the motor has stopped moving an item the motor will be shown in green.

Figure 26:
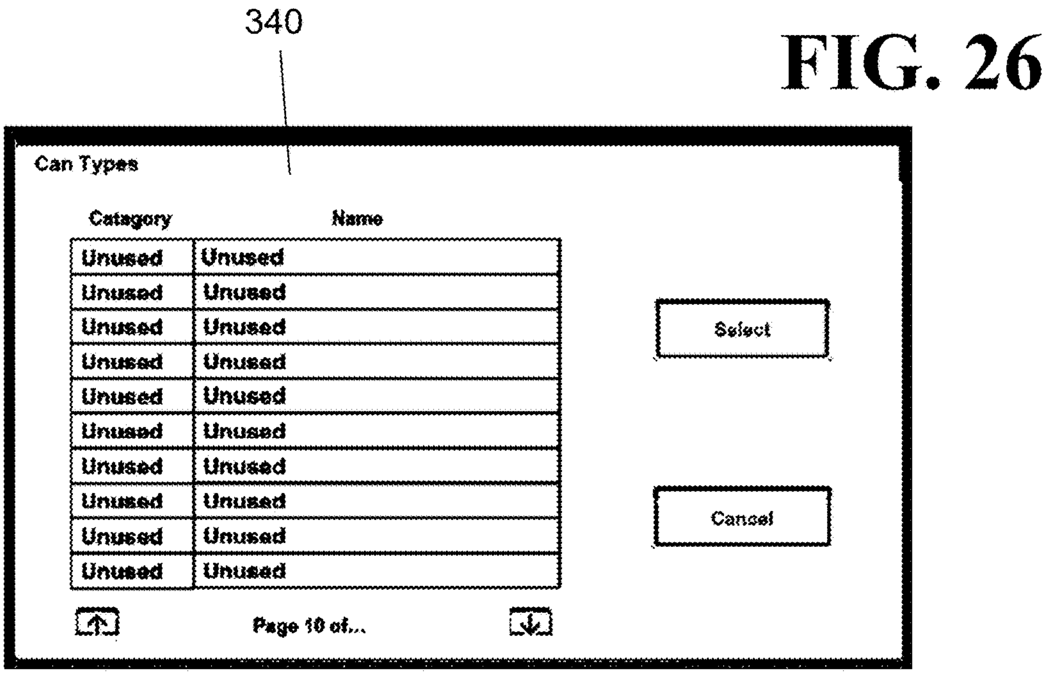
FIG. 26 is an illustration of a can selection screen for adjusting the size of can fed through the system of FIG. 2.

As shown in FIG. 24, after a user selects "change can size" in step 300 a popup window appears in step 335 that allows the user to select a can size from a list of preselected cans. FIG. 26 shows an example of a popup screen 340 where a user may select a can. Possible examples of sizes that can be selected include 7.5 oz sleek, 8 oz squat, 8.4 oz slim, 12 oz sleek, 12 oz standard, 16 oz standard, 19.2 oz standard, 24 oz standard, and peanut can sized.

Figure 27:
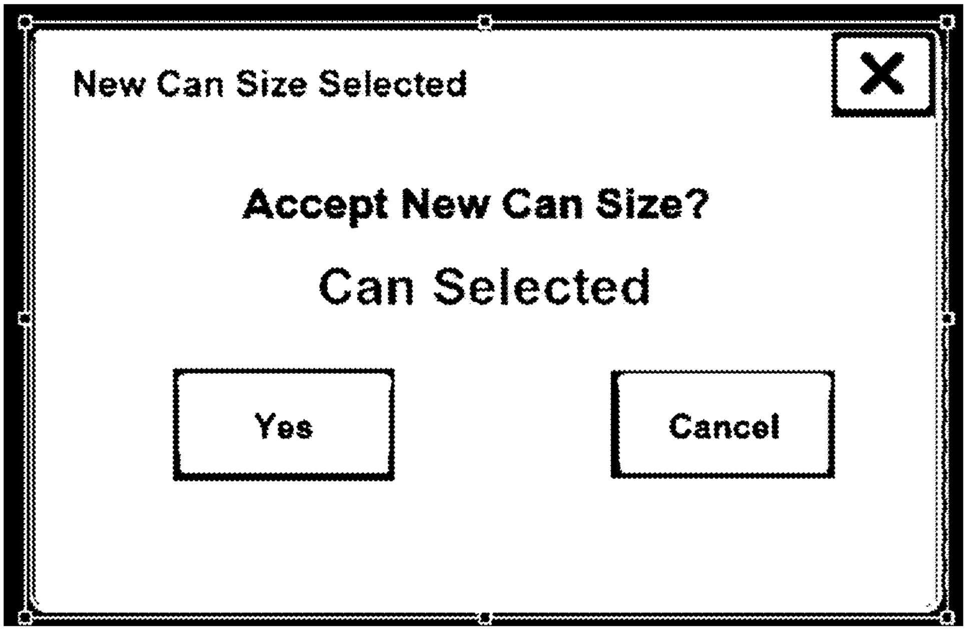
FIG. 27 is a first confirmation screen for the can selection screen shown in FIG. 26.

After the user selects the can size in step 335, a new popup window appears in step 345 asking the user to confirm the selection. An example of the popup window that appears in step 345 is shown in FIG. 27. While in the illustrated example of FIG. 27 it states: "New Can Size Selected," in other embodiments of the disclosure the popup window will list the name of the can being selected. In yet another embodiment of the disclosure, in addition to listing the name of the can size being selected, a visual representation of the can such as an image, will be in the popup window used to confirm the user's selection.

Figure 28:
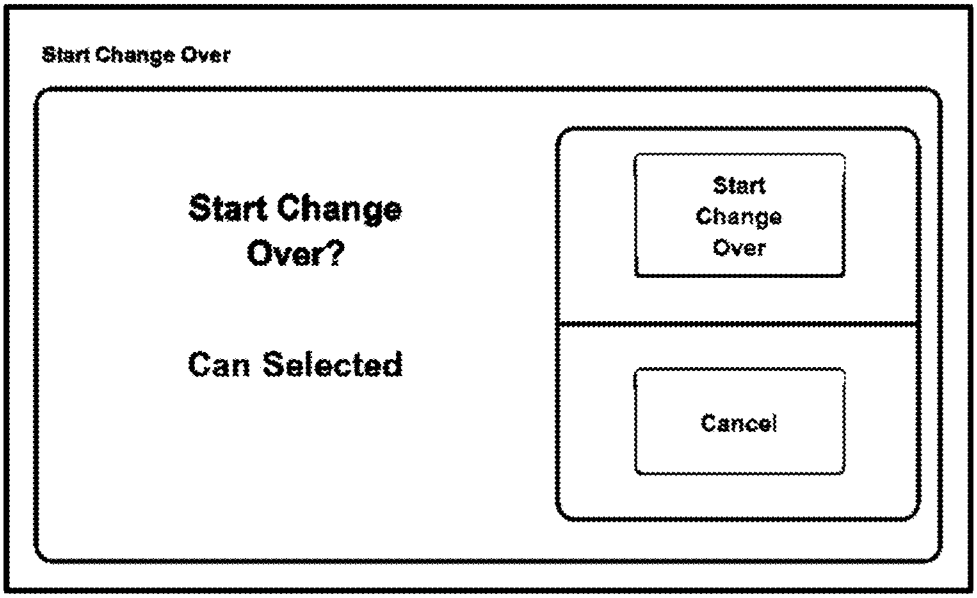
FIG. 28 is a second confirmation screen for the can selection screen shown in FIG. 26.

If the user selects "yes" in step 345 and confirms the size of the can, another popup window will appear in step 350 asking the user to confirm that the system can begin the changeover process. An example of the popup window of step 350 is shown in FIG. 28.

Figure 29:
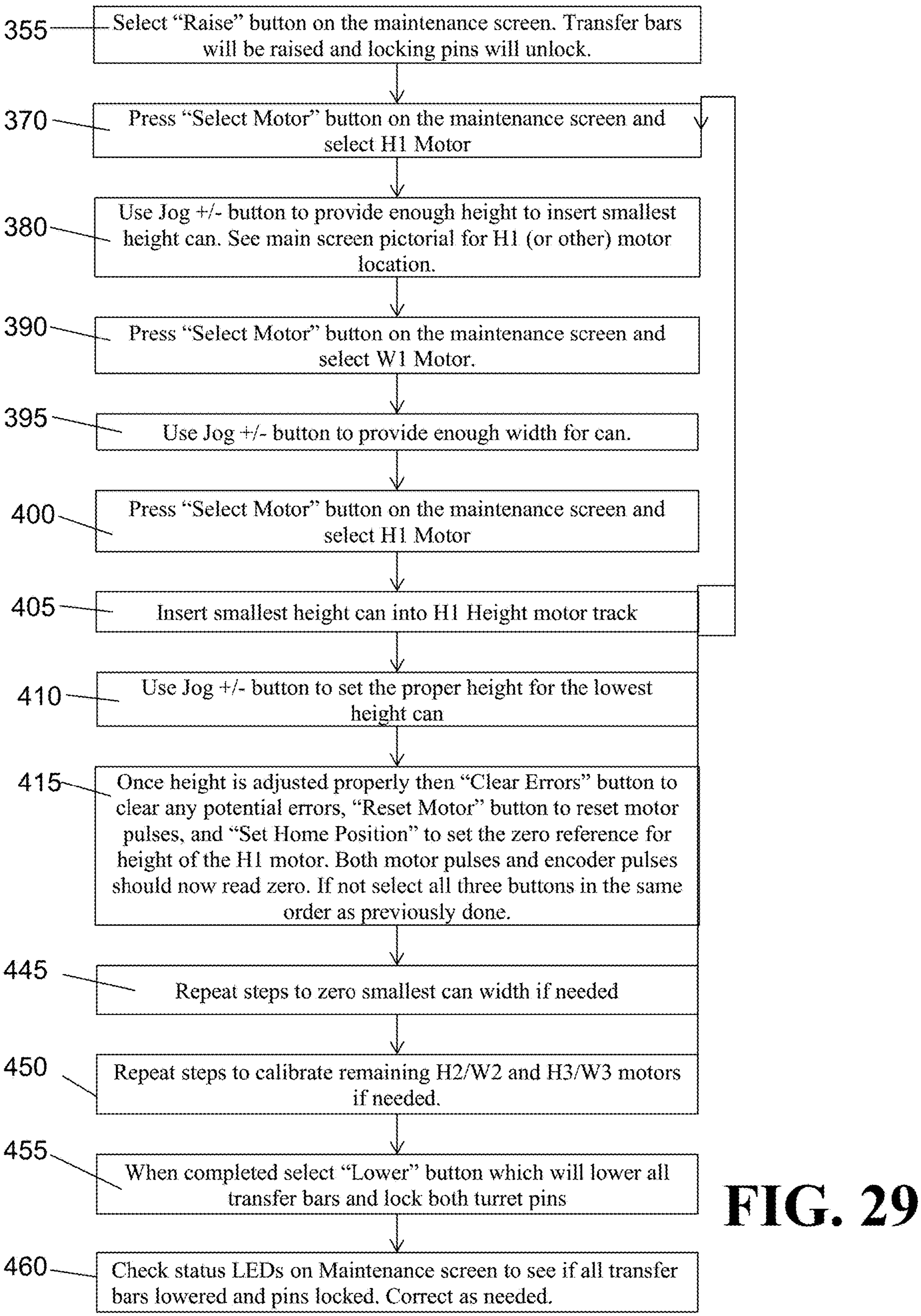
FIG. 29 is a flow chart illustrating a method of calibrating the motors of the feed assemblies of FIG. 2 using a reference standard and a computer control system.

FIG. 29 shows the method of calibrating the motors of the feed assemblies using a reference standard. By calibrating the motors and can feed assembly to a standard, the system can be quickly and repeatedly adjusted to preselected configurations for specific cans allowing for rapid changeovers in a canning or bottling line.

Figure 30:
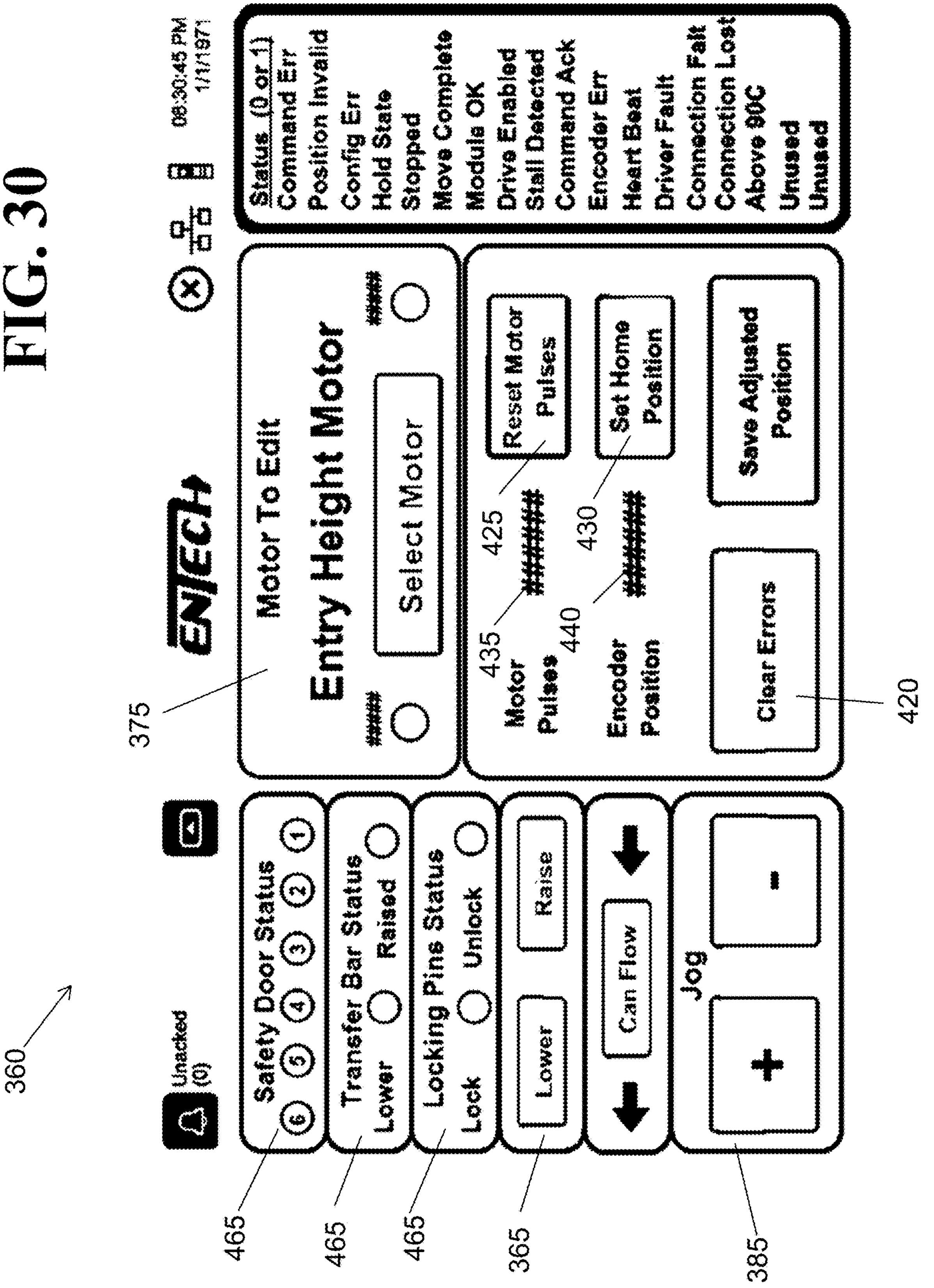
FIG. 30 shows a maintenance screen used in the calibration process of FIG. 29.
Figure 31:
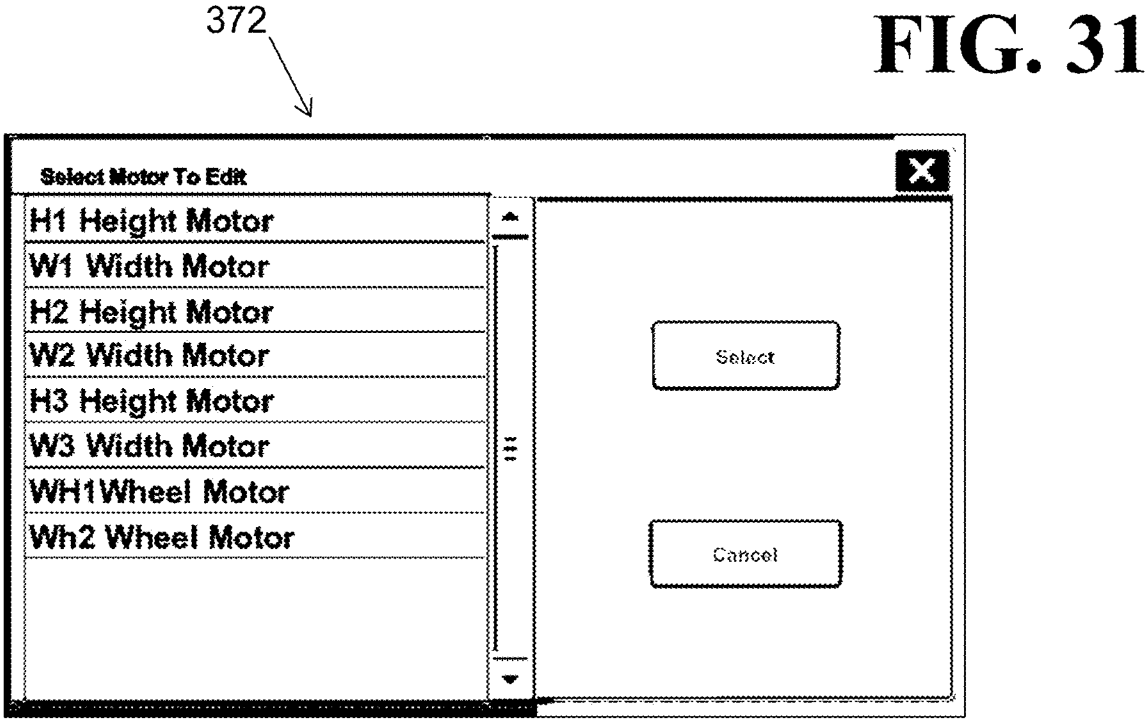
FIG. 31 shows a motor selection screen used in the calibration process of FIG. 29.

In step 355, the raise button is selected on a maintenance screen to disengage the transfer bars and unlock the locking pins from the turret. FIG. 30 shows an example of a maintenance screen 360 and raise/lower window 365. By disengaging the transfer bars and unlocking the locking pins from the turret, the motors of the system may be freely operated. In step 370 a motor is selected, and in an exemplary embodiment, the H1 motor is selected. An example motor selection window 372 is shown in FIG. 31. The H1 motor adjusts the height of the guide rails in a feed assembly. A motor selection window 375 is shown in FIG. 30. In step 380, the H1 motor is operated by pressing the +/−buttons in the jog window 385. The H1 motor is operated to provide sufficient height to the standard can, however in the first operation of the H1 motor the guide rails are not precisely aligned with the top of the standard.

In step 390, the motor selection window 375 is once again pressed and the W1 motor is selected. The W1 motor adjusts the width of the guide rails located on the sides of the feed assembly. In step 395, the +/−buttons in the jog window 385 are used to adjust the horizontal spacings of the side guide rails. After steps 380 and 395, there should be sufficient vertical and horizontal spacings of the guide rails to easily insert the calibration standard into the feed assembly.

In step 400 the motor selection window 375 is once again pressed, and the H1 motor is once again selected. In step 405, the user places the can standard, or the smallest height can, into the feed assembly. Using the +/−buttons in the jog window 385 in step 410 the H1 motor is adjusted so that the upper guide rails are precisely set to the proper height for the can standard or the can with the smallest height.

In step 415, after the H1 motor position is adjusted, it is set to the default or home position. Any errors are cleared by pressing the clear error button 420, the motor pulses for controlling the motor are reset using the "reset motor pulses" button 425, and the current position is set to home using the "set home position" button 430. Upon successful setting of the home position, the motor and encoder pulses (435, 440, respectively) should read zero.

In step 445, steps 370, 380, 390, 395, 400, 405, 410, and 415 are repeated for the W1 width motor to set the default or home width of the guide rails for the can or standard width. In step 450, steps 370, 380, 390, 395, 400, 405, 410, 415, and 445 are repeated for the motors of the other feed assemblies.

Following the calibration of the motors for the feed assemblies, in step 455 the raise/lower window 365 is utilized to lower the transfer bars and lock the turret pins. In step 460 the user checks the status windows 465 to ensure that the transfer bars have been lowered and the locking pins have been secured.

Figure 33:
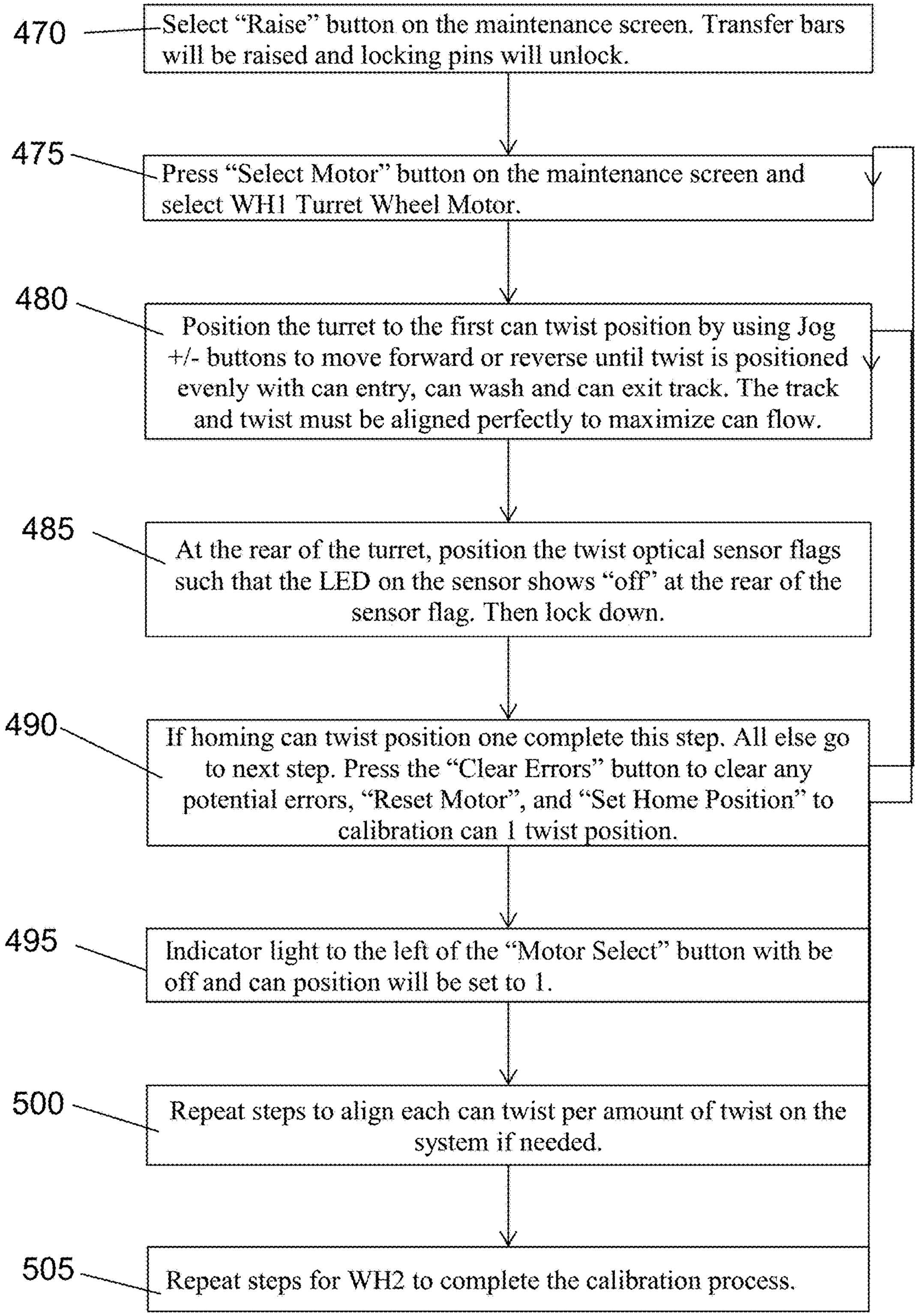
FIG. 33 is a flow chart illustrating a method of calibrating a turret of a can manipulation system using a computer control system.

FIG. 33 shows an exemplary method of calibrating a turret of a can manipulation system. In step 470, like in step 355, the raise/lower window 365 is used to raise/disengage the transfer bars of the feed assemblies and disengage the locking pins. Like in step 370, in step 475 the motor selection window 375 is utilized to select a motor. In the exemplary embodiment, the WH1 motor is selected to adjust the motor that rotates the turret. In step 480, the +/−buttons in the jog window 385 are used to operate the disc motor to spin the turret to align an aperture in the disc of the turret with a feed assembly. In the illustrated example, the alignment between the twist and the feed assembly is precisely aligned to maximize the flow rate of cans through the system.

In step 485 the measurement sprocket 65 is rotated relative to the turret such that the measurement sprocket 65 is at a predetermined position relative to the laser in the laser system 75. The measurement sprocket 65 is then locked down such that it is rotationally locked relative to the turret. In step 490, the orientation of the turret is set as the home position using the "clear errors" 420, "reset motor" 425, and "set home position" 430 buttons like was done with the motors of the feed assembly. In step 495 the user verifies that the light to the left of the "motor select" button in the motor selection window 375 is off and that the can position is set to 1. In step 500, the calibration process is repeated for each of the twists on the turret. In the illustrated example, there are eight possible positions for twists on the turret, however, in other embodiments of the disclosure the turret will have a higher or lower number of possible twists. In step 505 the steps are repeated for a second turret.

Figure 34:
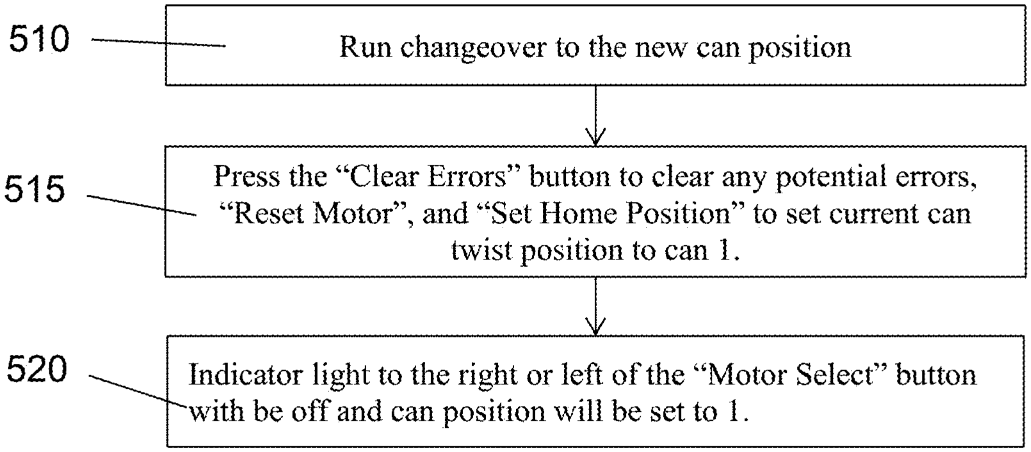
FIG. 34 is a flow chart illustrating a method of resetting the can position of the system.

FIG. 34 shows an exemplary method of resetting the can position of the system. In step 510 the can changeover procedure (shown in FIGS. 24-28) is run to set a new can size. In step 515 the "clear errors" 420, "reset motor" 425, and "set home position" 430 buttons are used to set the current can twist position to 1. In step 520, the user verifies that the light to the left of the "motor select" button in the motor selection window 375 is off and that the can position is set to 1.

Figure 35:
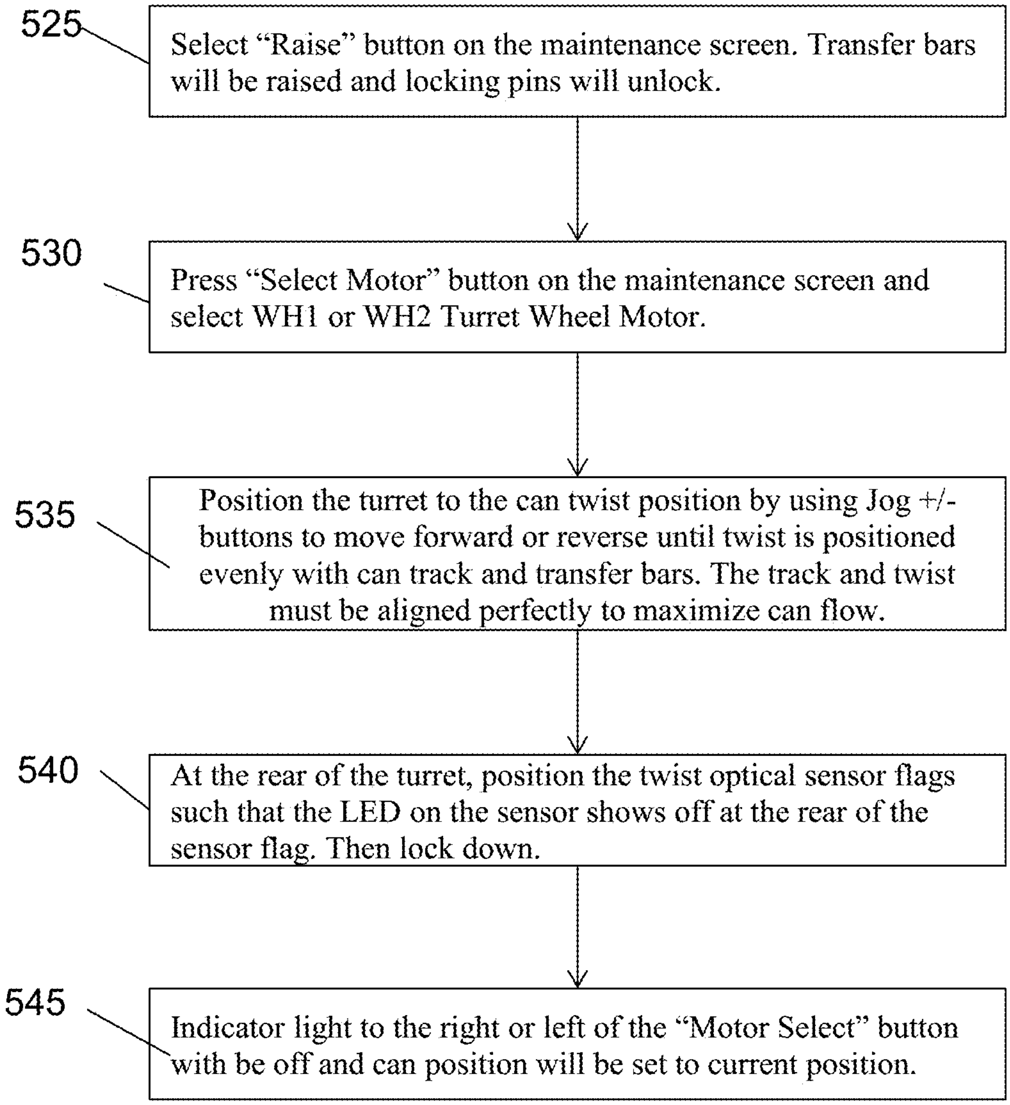
FIG. 35 is a flow chart illustrating a method of recalibrating a single position.

FIG. 35 shows an exemplary method of recalibrating a single position. Steps 525, 530, 535, 540, and 545 substantially repeat steps 470, 475, 480, 485, and 495 of the method shown in FIG. 33. The method shown in FIG. 35 illustrates the individual twists may be recalibrated without having to recalibrate all the twists in the turret.

Figure 32:
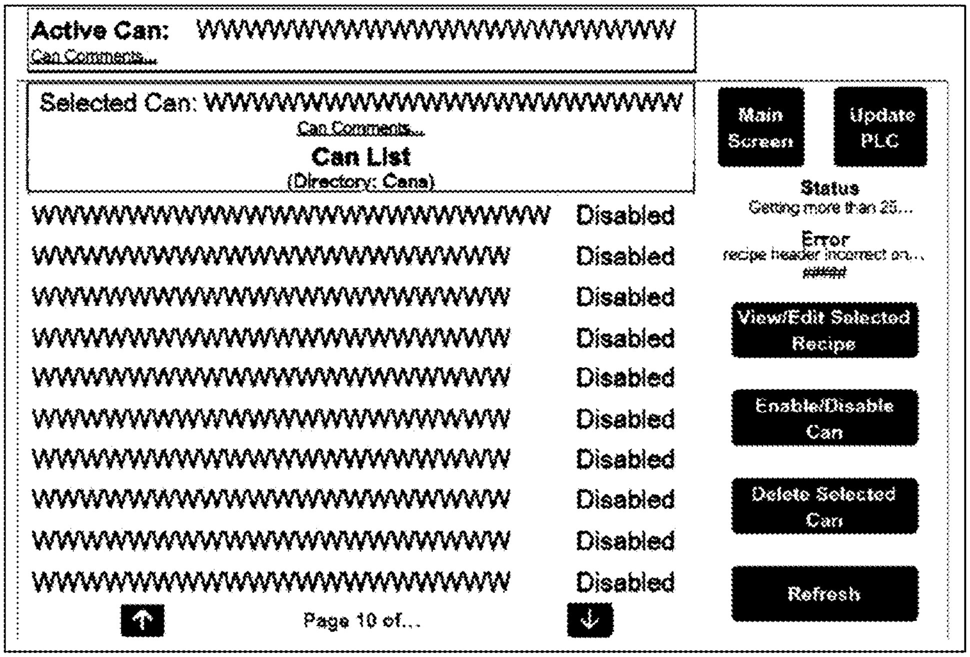
FIG. 32 shows a directory of can sizes saved by the system that may be selected to have the system quickly and efficiently reconfigure itself to accommodate a different size of can.

After the various motors have been calibrated, the height, width, twist position number, and encoder position information for each can is entered into the system. An example spreadsheet 550 of information for a 7.5 oz sleek can is shown in FIG. 36. Alternatively, this information can be learned by the system by adjusting the various motors to properly fit the can and then saving the information. The information for various sizes of cans is saved in a directory like the one shown in FIG. 32. The information shown in FIG. 36 may be stored in a computer readable medium (e.g., a computer hard drive) and is used to associated specific motor operations or settings (e.g., wheel encoder set to 4551 or width encoder set to 284) to a specific product (e.g., 7.5 oz sleeks)

Figure 37:
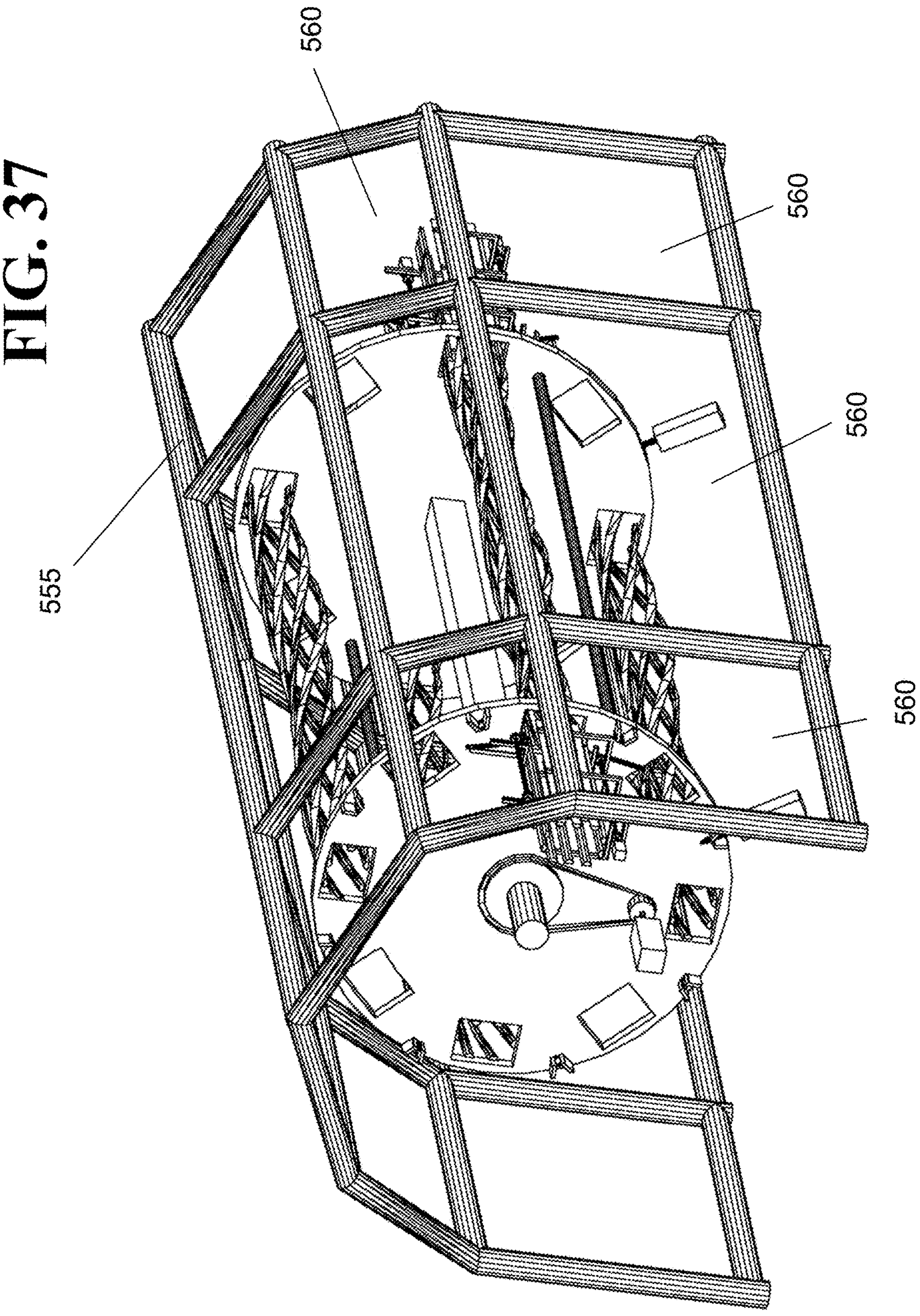
FIG. 37 shows a perspective view of a can manipulation system enclosed in a safety cage.

There are many moving parts of the motorized rapid changeover can manipulation system 10, and ensuring the safety of those operating the system is of key importance. As shown in FIG. 37, in one embodiment of the disclosure, a cage 555 encloses or partially encloses the can manipulation system 10. In order to allow users access to the can manipulation system 10, the cage 555 includes a plurality of panels 560 that may be opened or removed. There is a sensor associated with each of the panels and the system may include interlocks that prevent operation of the can manipulation system 10 when a panel has been opened or removed.

In alternate embodiments of the disclosure, other safety features may be incorporated into the system. In one example, a laser curtain is made in front of the can manipulation system using a plurality of lasers shining on photo-sensors. When a laser beam is interrupted, the can manipulation system ceases operation. In yet another embodiment of the disclosure, the current draw of the various motors are monitored and the system is shutdown if the motors experience unexpected resistance (e.g., such as when something gets caught by the rotating turret).

Figure 38:
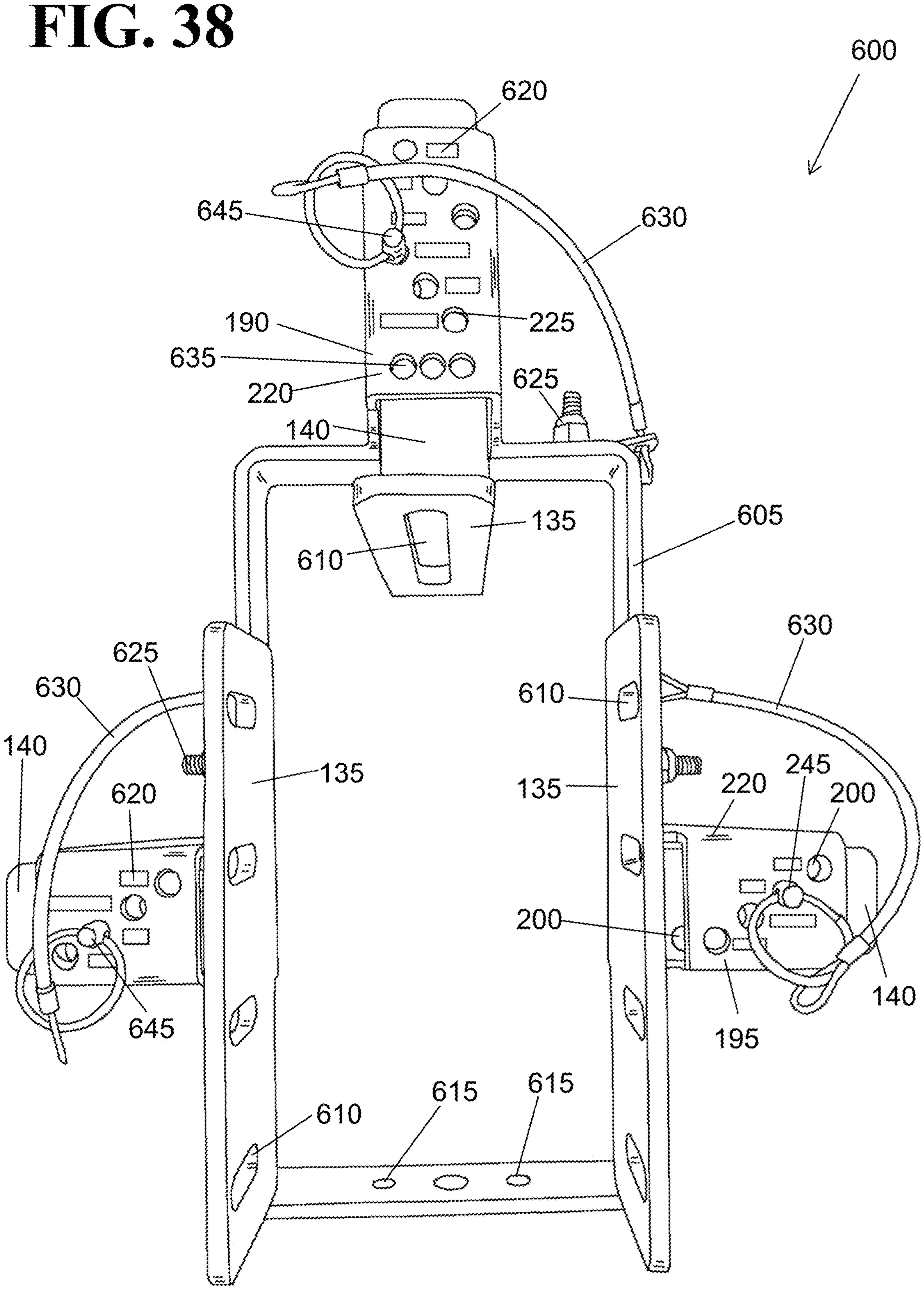
FIG. 38 shows an alternate embodiment of a non-motorized quick-change adjuster.

FIG. 38 shows an alternate embodiment of a non-motorized quick change adjuster 600 with a frame 605 secured to or integrally formed with a vertical manual adjuster 190 and horizontal manual adjusters 195 having pockets 220 adapted to receive second arms 140 that include a plurality of holes 200. In the illustrated example, the frame 605 is shown as a generally rectangular structure with the manual adjusters (190, 195) located at the top and sides of the frame 605. The first arms 135 associated with the horizontal manual adjusters 195 include a plurality of slots 610 while the first arm 135 associated with the vertical manual adjuster 190 includes a single slot 610. However, in other embodiments the first arms 135 may include a greater or lesser number of slots adapted to receive guide rail fasteners. For example, the first arm of the vertical manual adjuster may have two slots while the first arms of the horizontal manual adjusters may have three slots each. In the illustrated embodiment, the frame 605 also includes mounting points 615 adapted to receive guide rail fasteners.

The pockets 220 include a plurality of complimentary holes 225 and adjacent to the complimentary holes 225 are labels 620 indicating the size of product associated with aligning a hole 200 to the complimentary holes 225. Fasteners 625 secured to the frame connect to wires 630 secured to locking shafts 245 placed through the holes 200 and complimentary holes 225. As shown in the illustrated example, the number of holes 200 and complimentary holes 225 associated with the vertical manual adjuster 190 and horizontal manual adjusters 195 may not be equal.

In the illustrated example shown in FIG. 38, the vertical manual adjuster 190 has six holes/complimentary holes (200, 225) to allow for six unique positions of the vertically adjustable guide rail while the horizontal manual adjusters 195 only have four holes/complimentary holes (200, 225). Additionally, the vertical manual adjuster 190 has complimentary holes 225 arranged in two lines. The vertical manual adjuster 190 also includes a plurality of expansion holes 635 that are not currently aligned with any holes in the second arm 140. If users of the system utilize a can size that was not already associated with one of the six holes/complimentary holes (200, 225), the expansion holes 635 enable users to add additional sizes by drilling through the second arm through one of the expansion holes 635.

In one embodiment of the disclosure, each hole 200 of the vertical manual adjuster 190 has one and only one complimentary hole 225 (i.e., there are six holes 200 for the vertical manual adjuster of FIG. 38). In another embodiment of the disclosure, each hole of the vertical manual adjuster 190 has multiple complimentary holes 225 (i.e., there are three holes 200 for the vertical manual adjuster of FIG. 38).

Flowcharts representative of example machine readable instructions, which may be executed by programmable circuitry and/or representative of example operations which may be performed by programmable circuitry to implement and/or instantiate the monitoring system disclosed herein, are shown in FIGS. 24, 29, 33, 34, and 35. The machine readable instructions may be one or more executable programs or portion(s) of one or more executable programs for execution by programmable circuitry such as the programmable circuitry 3912 shown in the example processor platform 3900 discussed below in connection with FIG. 39 and/or may be one or more function(s) or portion(s) of functions to be performed by the example programmable circuitry (e.g., an FPGA) discussed below in connection with FIGS. 40 and/or 41. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 24, 29, 33, 34, and 35, many other methods of implementing the example monitoring system may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C-Sharp, Perl, Python, JavaScript, HyperText Markup Language (HTML), Structured Query Language (SQL), Swift, etc.

As mentioned above, the example operations of FIGS. 24, 29, 33, 34, and 35 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 39:
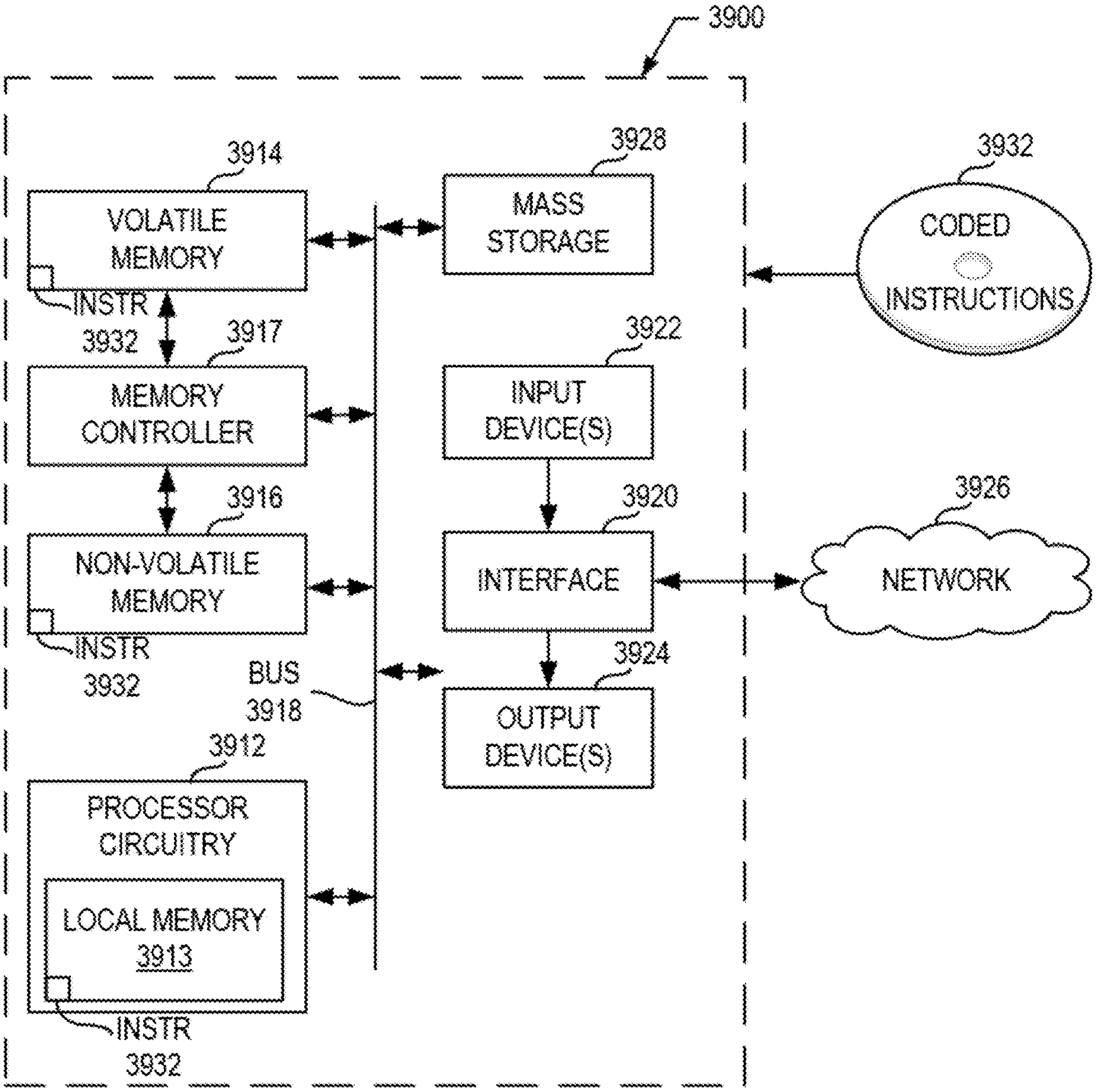
FIG. 39 is a block diagram of an example processing platform including programmable circuitry structured to execute, instantiate, and/or perform the example machine readable instructions and/or perform the example operations of FIGS. 24, 29, 33, 34, and 35 to implement the monitoring system disclosed herein.

FIG. 39 is a block diagram of an example programmable circuitry platform 3900 structured to execute and/or instantiate the example machine-readable instructions and/or the example operations of FIGS. 24, 29, 33, 34, and 35 to implement the monitoring system disclosed herein. The programmable circuitry platform 3900 can be, for example, a server, a personal computer, a workstation, a self-learning machine (e.g., a neural network), or any other type of computing and/or electronic device.

The programmable circuitry platform 3900 of the illustrated example includes programmable circuitry 3912. The programmable circuitry 3912 of the illustrated example is hardware. For example, the programmable circuitry 3912 can be implemented by one or more integrated circuits, logic circuits, FPGAs, microprocessors, CPUs, GPUS, DSPs, and/or microcontrollers from any desired family or manufacturer. The programmable circuitry 3912 may be implemented by one or more semiconductor based (e.g., silicon based) devices.

The programmable circuitry 3912 of the illustrated example includes a local memory 3913 (e.g., a cache, registers, etc.). The programmable circuitry 3912 of the illustrated example is in communication with main memory 3914, 3916, which includes a volatile memory 3914 and a non-volatile memory 3916, by a bus 3918. The volatile memory 3914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 3916 may be implemented by flash memory and/or any other desired type of memory device. Access to the main memory 3914, 3916 of the illustrated example is controlled by a memory controller 3917. In some examples, the memory controller 3917 may be implemented by one or more integrated circuits, logic circuits, microcontrollers from any desired family or manufacturer, or any other type of circuitry to manage the flow of data going to and from the main memory 3914, 3916.

The programmable circuitry platform 3900 of the illustrated example also includes interface circuitry 3920. The interface circuitry 3920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 3922 are connected to the interface circuitry 3920. The input device(s) 3922 permit(s) a user (e.g., a human user, a machine user, etc.) to enter data and/or commands into the programmable circuitry 3912. The input device(s) 3922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 3924 are also connected to the interface circuitry 3920 of the illustrated example. The output device(s) 3924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a speaker, and/or any other type of output/display device. The interface circuitry 3920 of the illustrated example, thus, typically includes a graphics driver card, a graphics driver chip, and/or graphics processor circuitry such as a GPU.

The interface circuitry 3920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 3926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 3900 of the illustrated example also includes one or more mass storage discs or devices 3928 to store firmware, software, and/or data. Examples of such mass storage discs or devices 3928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 3932, which may be implemented by the machine readable instructions of FIGS. 24, 29, 33, 34, and 35, may be stored in the mass storage device 3928, in the volatile memory 3914, in the non-volatile memory 3916, and/or on at least one non-transitory computer readable storage medium such as a CD or DVD which may be removable.

Figure 40:
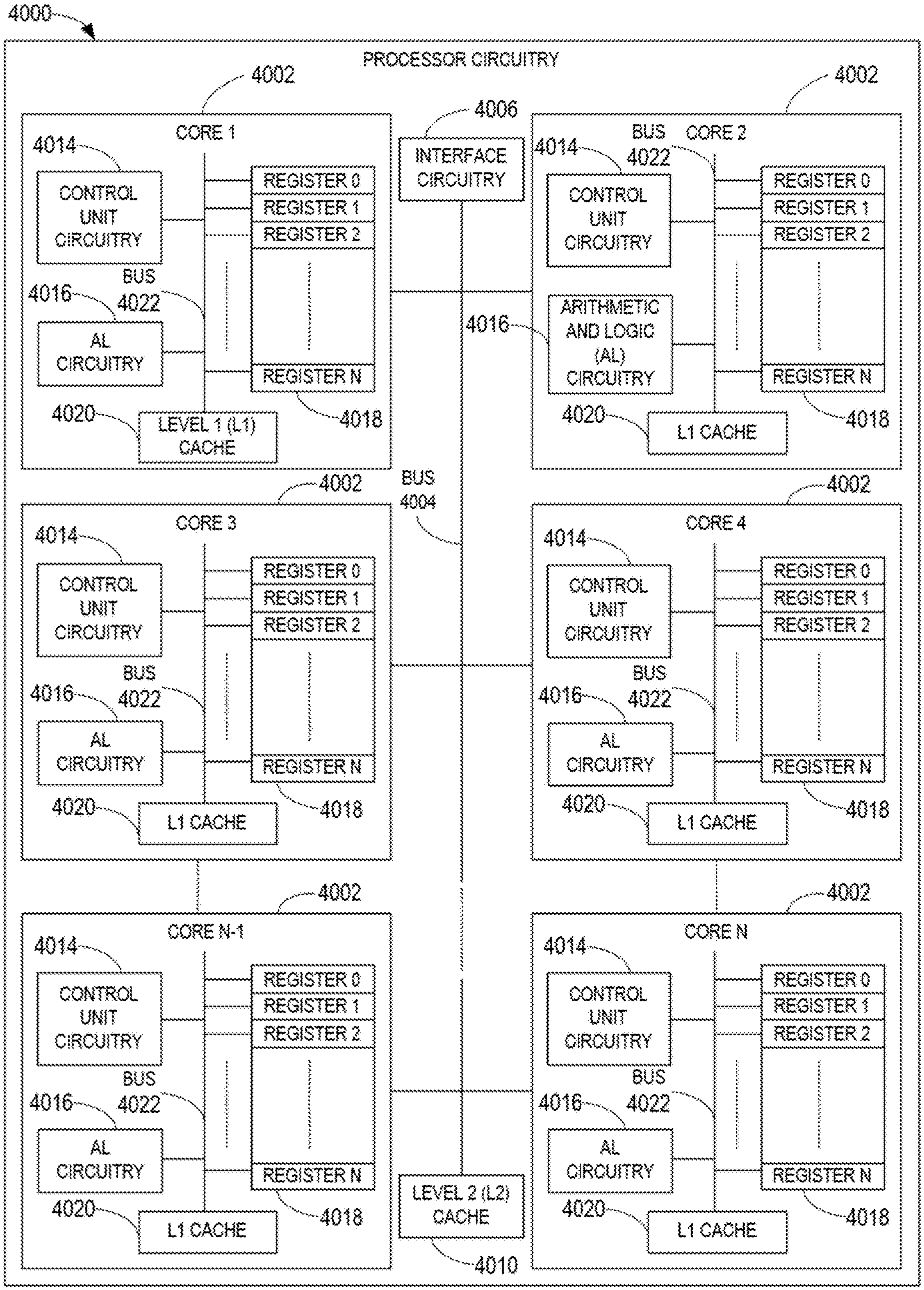
FIG. 40 is a block diagram of an example implementation of the programmable circuitry of FIG. 39.

FIG. 40 is a block diagram of an example implementation of the programmable circuitry 3912 of FIG. 39. In this example, the programmable circuitry 3912 of FIG. 39 is implemented by a microprocessor 4000. For example, the microprocessor 4000 may be a general-purpose microprocessor (e.g., general-purpose microprocessor circuitry). The microprocessor 4000 executes some or all of the machine-readable instructions of the flowcharts of FIGS. 24, 29, 33, 34, and 35 to effectively instantiate the monitoring system as logic circuits to perform operations corresponding to those machine readable instructions. In some such examples, the circuitry of FIG. [ER-Diagram] is instantiated by the hardware circuits of the microprocessor 4000 in combination with the machine-readable instructions. For example, the microprocessor 4000 may be implemented by multi-core hardware circuitry such as a CPU, a DSP, a GPU, an XPU, etc. Although it may include any number of example cores 4002 (e.g., 1 core), the microprocessor 4000 of this example is a multi-core semiconductor device including N cores. The cores 4002 of the microprocessor 4000 may operate independently or may cooperate to execute machine readable instructions. For example, machine code corresponding to a firmware program, an embedded software program, or a software program may be executed by one of the cores 4002 or may be executed by multiple ones of the cores 4002 at the same or different times. In some examples, the machine code corresponding to the firmware program, the embedded software program, or the software program is split into threads and executed in parallel by two or more of the cores 4002. The software program may correspond to a portion or all of the machine readable instructions and/or operations represented by the flowcharts of FIGS. 24, 29, 33, 34, and 35.

The cores 4002 may communicate by a first example bus 4004. In some examples, the first bus 4004 may be implemented by a communication bus to effectuate communication associated with one(s) of the cores 4002. For example, the first bus 4004 may be implemented by at least one of an Inter-Integrated Circuit (I2C) bus, a Serial Peripheral Interface (SPI) bus, a PCI bus, or a PCIe bus. Additionally or alternatively, the first bus 4004 may be implemented by any other type of computing or electrical bus. The cores 4002 may obtain data, instructions, and/or signals from one or more external devices by example interface circuitry 4006. The cores 4002 may output data, instructions, and/or signals to the one or more external devices by the interface circuitry 4006. Although the cores 4002 of this example include example local memory 4020 (e.g., Level 1 (L1) cache that may be split into an L1 data cache and an L1 instruction cache), the microprocessor 4000 also includes example shared memory 4010 that may be shared by the cores (e.g., Level 2 (L2 cache)) for high-speed access to data and/or instructions. Data and/or instructions may be transferred (e.g., shared) by writing to and/or reading from the shared memory 4010. The local memory 4020 of each of the cores 4002 and the shared memory 4010 may be part of a hierarchy of storage devices including multiple levels of cache memory and the main memory (e.g., the main memory 3914, 3916 of FIG. 39). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 4002 may be referred to as a CPU, DSP, GPU, etc., or any other type of hardware circuitry. Each core 4002 includes control unit circuitry 4014, arithmetic and logic (AL) circuitry (sometimes referred to as an ALU) 4016, a plurality of registers 4018, the local memory 4020, and a second example bus 4022. Other structures may be present. For example, each core 4002 may include vector unit circuitry, single instruction multiple data (SIMD) unit circuitry, load/store unit (LSU) circuitry, branch/jump unit circuitry, floating-point unit (FPU) circuitry, etc. The control unit circuitry 4014 includes semiconductor-based circuits structured to control (e.g., coordinate) data movement within the corresponding core 4002. The AL circuitry 4016 includes semiconductor-based circuits structured to perform one or more mathematic and/or logic operations on the data within the corresponding core 4002. The AL circuitry 4016 of some examples performs integer based operations. In other examples, the AL circuitry 4016 also performs floating-point operations. In yet other examples, the AL circuitry 4016 may include first AL circuitry that performs integer-based operations and second AL circuitry that performs floating-point operations. In some examples, the AL circuitry 4016 may be referred to as an Arithmetic Logic Unit (ALU).

The registers 4018 are semiconductor-based structures to store data and/or instructions such as results of one or more of the operations performed by the AL circuitry 4016 of the corresponding core 4002. For example, the registers 4018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 4018 may be arranged in a bank as shown in FIG. 40. Alternatively, the registers 4018 may be organized in any other arrangement, format, or structure, such as by being distributed throughout the core 4002 to shorten access time. The second bus 4022 may be implemented by at least one of an I2C bus, a SPI bus, a PCI bus, or a PCIe bus.

Each core 4002 and/or, more generally, the microprocessor 4000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 4000 is a semiconductor device fabricated to include many transistors interconnected to implement the structures described above in one or more integrated circuits (ICs) contained in one or more packages.

The microprocessor 4000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 4000, in the same chip package as the microprocessor 4000 and/or in one or more separate packages from the microprocessor 4000.

Figure 41:
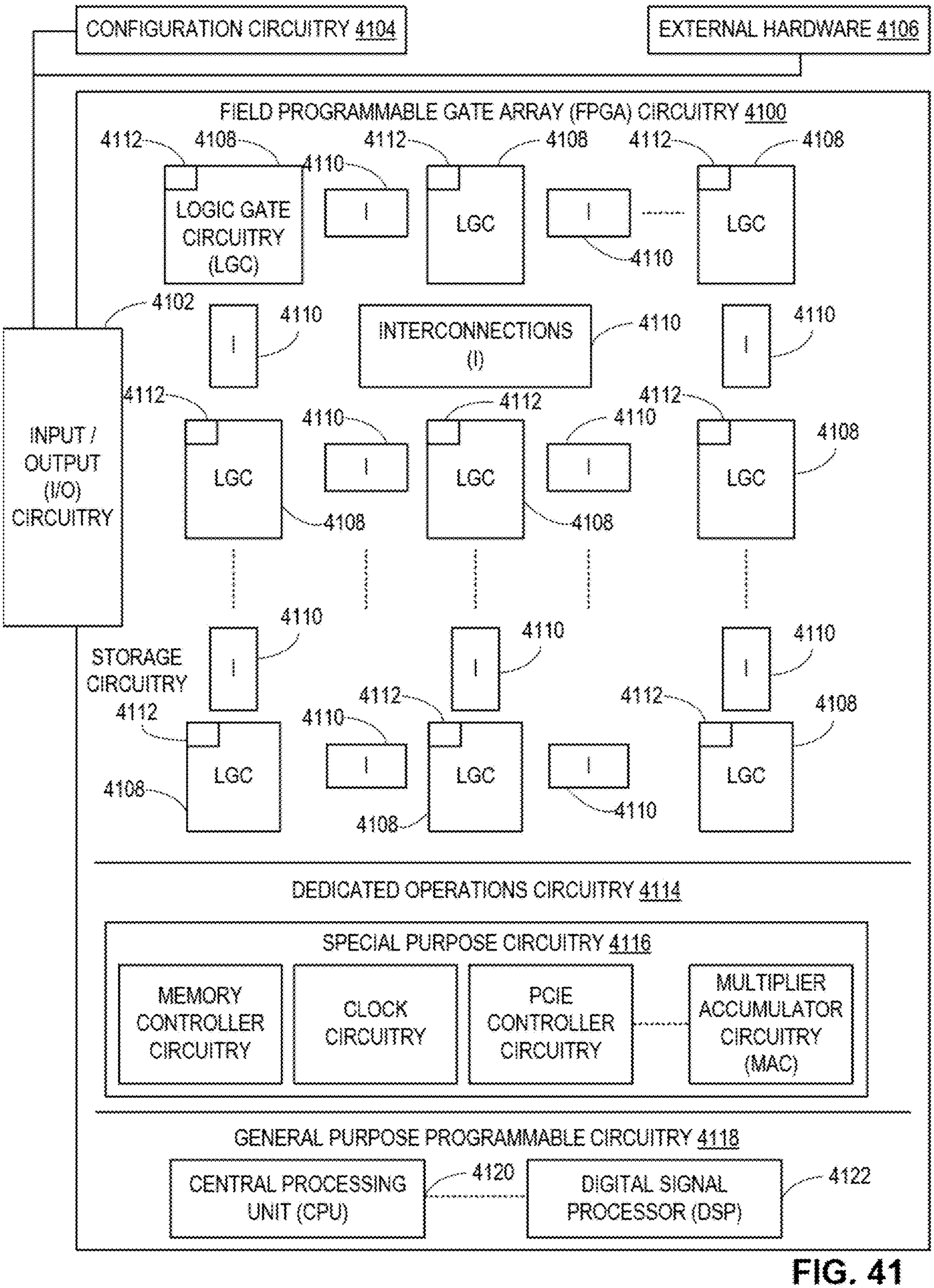
FIG. 41 is a block diagram of another example implementation of the programmable circuitry of FIG. 39.

FIG. 41 is a block diagram of another example implementation of the programmable circuitry 3912 of FIG. 39. In this example, the programmable circuitry 3912 is implemented by FPGA circuitry 4100. For example, the FPGA circuitry 4100 may be implemented by an FPGA. The FPGA circuitry 4100 can be used, for example, to perform operations that could otherwise be performed by the example microprocessor 4000 of FIG. 40 executing corresponding machine readable instructions. However, once configured, the FPGA circuitry 4100 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 4000 of FIG. 40 described above (which is a general purpose device that may be programmed to execute some or all of the machine readable instructions represented by the flowchart(s) of FIGS. 24, 29, 33, 34, and 35 but whose interconnections and logic circuitry are fixed once fabricated), the FPGA circuitry 4100 of the example of FIG. 41 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 24, 29, 33, 34, and 35. In particular, the FPGA circuitry 4100 may be thought of as an array of logic gates, interconnections, and switches. The switches can be programmed to change how the logic gates are interconnected by the interconnections, effectively forming one or more dedicated logic circuits (unless and until the FPGA circuitry 4100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 24, 29, 33, 34, and 35. As such, the FPGA circuitry 4100 may be configured and/or structured to effectively instantiate some or all of the operations/functions corresponding to the machine readable instructions of the flowchart(s) of FIGS. 24, 29, 33, 34, and 35 as dedicated logic circuits to perform the operations/functions corresponding to those software instructions in a dedicated manner analogous to an ASIC. Therefore, the FPGA circuitry 4100 may perform the operations/functions corresponding to the some or all of the machine readable instructions of FIGS. 24, 29, 33, 34, and 35 faster than the general-purpose microprocessor can execute the same.

In the example of FIG. 41, the FPGA circuitry 4100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 4100 of FIG. 41 may access and/or load the binary file to cause the FPGA circuitry 4100 of FIG. 41 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 4100 of FIG. 41 to cause configuration and/or structuring of the FPGA circuitry 4100 of FIG. 41, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 4100 of FIG. 41 may access and/or load the binary file to cause the FPGA circuitry 4100 of FIG. 41 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 4100 of FIG. 41 to cause configuration and/or structuring of the FPGA circuitry 4100 of FIG. 41, or portion(s) thereof.

The FPGA circuitry 4100 of FIG. 41, includes example input/output (I/O) circuitry 4102 to obtain and/or output data to/from example configuration circuitry 4104 and/or external hardware 4106. For example, the configuration circuitry 4104 may be implemented by interface circuitry that may obtain a binary file, which may be implemented by a bit stream, data, and/or machine-readable instructions, to configure the FPGA circuitry 4100, or portion(s) thereof. In some such examples, the configuration circuitry 4104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 4106 may be implemented by external hardware circuitry. For example, the external hardware 4106 may be implemented by the microprocessor 4000 of FIG. 40.

The FPGA circuitry 4100 also includes an array of example logic gate circuitry 4108, a plurality of example configurable interconnections 4110, and example storage circuitry 4112. The logic gate circuitry 4108 and the configurable interconnections 4110 are configurable to instantiate one or more operations/functions that may correspond to at least some of the machine readable instructions of FIGS. 24, 29, 33, 34, and 35 and/or other desired operations. The logic gate circuitry 4108 shown in FIG. 41 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 4108 to enable configuration of the electrical structures and/or the logic gates to form circuits to perform desired operations/functions. The logic gate circuitry 4108 may include other electrical structures such as look-up tables (LUTs), registers (e.g., flip-flops or latches), multiplexers, etc.

The configurable interconnections 4110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 4108 to program desired logic circuits.

The storage circuitry 4112 of the illustrated example is structured to store result(s) of the one or more of the operations performed by corresponding logic gates. The storage circuitry 4112 may be implemented by registers or the like. In the illustrated example, the storage circuitry 4112 is distributed amongst the logic gate circuitry 4108 to facilitate access and increase execution speed.

The example FPGA circuitry 4100 of FIG. 41 also includes example dedicated operations circuitry 4114. In this example, the dedicated operations circuitry 4114 includes special purpose circuitry 4116 that may be invoked to implement commonly used functions to avoid the need to program those functions in the field. Examples of such special purpose circuitry 4116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 4100 may also include example general purpose programmable circuitry 4118 such as an example CPU 4120 and/or an example DSP 4122. Other general purpose programmable circuitry 4118 may additionally or alternatively be present such as a GPU, an XPU, etc., that can be programmed to perform other operations.

Although FIGS. 40 and 41 illustrate two example implementations of the programmable circuitry 3912 of FIG. 39, many other approaches are contemplated. For example, FPGA circuitry may include an on-board CPU, such as one or more of the example CPU 4120 of FIG. 40. Therefore, the programmable circuitry 3912 of FIG. 39 may additionally be implemented by combining at least the example microprocessor 4000 of FIG. 40 and the example FPGA circuitry 4100 of FIG. 41. In some such hybrid examples, one or more cores 4002 of FIG. 40 may execute a first portion of the machine readable instructions represented by the flowchart(s) of FIGS. 24, 29, 33, 34, and 35 to perform first operation(s)/function(s), the FPGA circuitry 4100 of FIG. 41 may be configured and/or structured to perform second operation(s)/function(s) corresponding to a second portion of the machine readable instructions represented by the flowcharts of FIGS. 24, 29, 33, 34, and 35, and/or an ASIC may be configured and/or structured to perform third operation(s)/function(s) corresponding to a third portion of the machine readable instructions represented by the flowcharts of FIGS. 24, 29, 33, 34, and 35.

It should be understood that some or all of the monitoring system may, thus, be instantiated at the same or different times. For example, same and/or different portion(s) of the microprocessor 4000 of FIG. 40 may be programmed to execute portion(s) of machine-readable instructions at the same and/or different times. In some examples, same and/or different portion(s) of the FPGA circuitry 4100 of FIG. 41 may be configured and/or structured to perform operations/functions corresponding to portion(s) of machine-readable instructions at the same and/or different times.

In some examples, some or all of the monitoring system may be instantiated, for example, in one or more threads executing concurrently and/or in series. For example, the microprocessor 4000 of FIG. 40 may execute machine readable instructions in one or more threads executing concurrently and/or in series. In some examples, the FPGA circuitry 4100 of FIG. 41 may be configured and/or structured to carry out operations/functions concurrently and/or in series. Moreover, in some examples, some or all of the monitoring system may be implemented within one or more virtual machines and/or containers executing on the microprocessor 4000 of FIG. 40.

In some examples, the programmable circuitry 3912 of FIG. 39 may be in one or more packages. For example, the microprocessor 4000 of FIG. 40 and/or the FPGA circuitry 4100 of FIG. 41 may be in one or more packages. In some examples, an XPU may be implemented by the programmable circuitry 3912 of FIG. 39, which may be in one or more packages. For example, the XPU may include a CPU (e.g., the microprocessor 4000 of FIG. 40, the CPU 4120 of FIG. 41, etc.) in one package, a DSP (e.g., the DSP 4122 of FIG. 41) in another package, a GPU in yet another package, and an FPGA (e.g., the FPGA circuitry 4100 of FIG. 41) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

The inventors contemplate several alterations and improvements to the disclosed disclosure. Other alterations, variations, and combinations are possible that fall within the scope of the present disclosure. Although the preferred embodiment of the present disclosure has been described, those skilled in the art will recognize other modifications that may be made that would nonetheless fall within the scope of the present disclosure.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A can manipulating system for orienting a series of cans moving through the system, the system comprising:
- a can manipulating turret including:
  - a twist adapted to pass the series of cans therethrough and change an orientation of the cans,
  - a first disc secured to a first end of the twist,
  - a second disc secured to a second end of the twist, and
  - a support brace rotationally securing the first disc to the second disc to rotationally
  - lock the rotation of the first disc about an axis to the rotation of the second disc about the axis; and
- a can feed assembly located adjacent the first disc and adapted:
  - to position and support the series of cans received from a production line feeding the can manipulating system and
  - to pass the series of cans to the can manipulating turret;
- the can feed assembly including:
  - a plurality of horizontally adjustable guide rails,
  - a vertically adjustable guide rail,
  - a vertical mount secured to the vertically adjustable guide rail,
  - a vertical actuator secured to the vertical mount and adapted to vertically change the position of the vertically adjustable guide rail,
  - a side mount secured to the plurality of horizontally adjustable guide rails,
  - a horizontal actuator:
    - secured to the side mount and
    - adapted to horizontally change the position of the plurality of horizontally adjustable guide rails, and
  - a transfer bar connected to the vertically adjustable guide rail.

2. The can manipulating system of claim 1, further comprising:
- a moveable locking pin;
- the can manipulating turret including:
  - a plurality of receivers positioned about a circumference of the first disc, each of the plurality of receivers including an aperture adapted to receive the moveable locking pin; and
  - wherein when the moveable locking pin is secured within the aperture of a first of the plurality of receivers,
  - the twist is aligned to receive cans from the can feed assembly, and rotation of the can manipulating turret about the axis is prevented.

3. The can manipulating system of claim 2, wherein:
- the first of the plurality of receivers includes a guide slope extending:
  - from adjacent of a first of the plurality of receivers, and
  - away from the axis of rotation.

4. The can manipulating system of claim 2, wherein the first of the plurality of receivers is secured to the first disc via a translational positioner configured to move the first of the plurality of receivers perpendicular to a radius of the first disc.

5. The can manipulating system of claim 2, wherein:
- the first disc includes a plurality of holes adapted to pass therethrough, and
- a number of the plurality of holes is equal to a number of the plurality of receivers secured to the first disc.

6. The can manipulating system of claim 2, wherein:
- the can feed assembly includes a bar actuator:
- connected to:
  - the vertical mount and
  - the transfer bar, and
- having a first extension configuration and a second extension configuration; the transfer bar is connected to the vertically adjustable guide rail via a hinge; and actuation of the bar actuator from the first extension configuration to the second extension configuration rotates the transfer bar about the hinge.

7. The can manipulating system of claim 6, wherein:
- when the bar actuator is in the first extension configuration, a first end of the transfer bar is located a first distance from the first disc;
- when the bar actuator is in the second extension configuration, the first end of the transfer bar is located a second distance from the first disc; and
- the second distance is greater than the first distance.

8. The can manipulating system of claim 7, wherein the transfer bar includes a second end opposite the first end and adjacent to the hinge, and in the first extension configuration, both the first end and second end of the transfer bar are inline with the vertically adjustable guide rail.

9. The can manipulating system of claim 6, further comprising an interlock system that prevents removal of the moveable locking pin from the aperture while the bar actuator is in the first extension configuration.

10. The can manipulating system of claim 9, wherein:
- the moveable locking pin is configured to be moved by a pneumatic cylinder;
- the bar actuator is a pneumatic actuator with a threshold pressure;
- a single compression source powers both the pneumatic cylinder and the pneumatic actuator via the interlock system; and the interlock system only pressurizes the pneumatic cylinder when a pressure applied to the pneumatic actuator is above the threshold pressure.

11. The can manipulating system of claim 6, wherein:

the moveable locking pin is configured to be moved by a pneumatic cylinder with a first threshold pressure;

the bar actuator is a pneumatic actuator with a second threshold pressure; a single compression source powers both the pneumatic cylinder and the pneumatic actuator; and the first threshold pressure is different from the second threshold pressure.

12. The can manipulating system of claim 1, further comprising:

a measurement sprocket rotationally secured to at least one of the first disc and second disc, and a measurement laser configured to be intermittently blocked by the measurement sprocket during rotation of the can manipulating turret, wherein a number of interruptions of the measurement laser correlates to a rotation of the can manipulating turret.

13. The can manipulating system of claim 1, wherein the vertical actuator includes:

a motor configured to rotate a shaft connecting to a pinion, and a rack structure configured to be vertically moved by rotation of the pinion.

14. The can manipulating system of claim 1, wherein:

the vertical actuator includes:

a pocket receiving an arm of the vertical mount, the pocket having a first plurality of holes arranged along a first line oriented at a first angle to a length of the pocket, and the arm having a second plurality of holes arranged along a second line at a second angle to a length of the arm;

wherein the first angle is different than the second angle.

15. The can manipulating system of claim 14, wherein both the first plurality of holes and the second plurality of holes each have a diameter, and a locking shaft extends through:

a first of the first plurality of holes, and a first of the second plurality of holes;

to lock the vertical actuator and the vertically adjustable guide rail at a first predetermined position.

16. The can manipulating system of claim 15, wherein:

the locking shaft is configured to extend through:

a second of the first plurality of holes, and a second of the second plurality of holes;

to lock the vertical actuator and the vertically adjustable guide rail at a second predetermined position, wherein the second predetermined position is separated from the first predetermined position by less than the diameters of the first and second plurality of holes.

17. The can manipulating system of claim 1, wherein:

each of the first and second disc include at least four holes adapted for passing the series of cans therethrough;

a first end of the twist is located adjacent to a first hole in the first disc; and a second end of the twist is located adjacent to a second hole in the second disc.

18. The can manipulating system of claim 1, wherein:

the can feed assembly includes a stationary guide rail located below the vertically adjustable guide rail; and a conduction bar located directly below the transfer bar and connected to the stationary guide rail via a second hinge.

19. The can manipulating system of claim 1, wherein:

the vertical actuator includes:

a first motor configured to rotate a first shaft connecting to a first pinion, and a first rack structure configured to be vertically moved by rotation of the first pinion;

the horizontal actuator includes:

a second motor configured to rotate a second shaft connecting to a second pinion, and a second rack structure configured to be horizontally moved by rotation of the second pinion;

a third motor configured to rotate the can manipulating turret about the axis;

a control system is configured to selectively power the first, second, and third motors; and the control system includes a computer readable medium associating each of a plurality of products with a specific operation of the first, second, and third motors.

20. A system to manipulate the orientation of objects, the system comprising:

a turret including:

a twist adapted to pass a series of objects therethrough and change an orientation of the objects, a first disc secured to a first end of the twist, a second disc secured to a second end of the twist, and a feed assembly located adjacent the first disc, the feed assembly to pass the series of cans to the turret, the feed assembly including:

an adjustable guide rail, an first actuator to change the position of the adjustable guide rail, a transfer bar, a hinge to rotatably couple the transfer bar to the feed assembly, and a second actuator coupled to the transfer bar, the second actuator to rotate the transfer bar about the hinge.

* * * * *